(12) United States Patent
Manj et al.

(10) Patent No.: US 12,355,824 B2
(45) Date of Patent: Jul. 8, 2025

(54) DELIVERY OF APPS IN A MEDIA STREAM

(71) Applicant: Apple Inc., Cupertino, CA (US)

(72) Inventors: Nurinder Manj, San Jose, CA (US); Eswar Priyadarshan, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 506 days.

(21) Appl. No.: 16/911,355

(22) Filed: Jun. 24, 2020

(65) Prior Publication Data

US 2020/0396315 A1 Dec. 17, 2020

Related U.S. Application Data

(63) Continuation of application No. 14/814,287, filed on Jul. 30, 2015, now Pat. No. 10,708,391.

(Continued)

(51) Int. Cl.
*H04L 65/1059* (2022.01)
*G06F 16/955* (2019.01)
*H04L 65/401* (2022.01)
*H04L 65/60* (2022.01)
*H04L 67/01* (2022.01)
*H04L 67/04* (2022.01)
*H04L 67/12* (2022.01)
*H04L 67/125* (2022.01)

(52) U.S. Cl.
CPC ...... *H04L 65/1059* (2013.01); *G06F 16/9566* (2019.01); *H04L 65/4015* (2013.01); *H04L 65/60* (2013.01); *H04L 67/01* (2022.05); *H04L 67/04* (2013.01); *H04L 67/12* (2013.01); *H04L 67/125* (2013.01)

(58) Field of Classification Search
CPC ......... H04L 67/42; H04L 65/60; H04L 67/01; H04L 65/1059; H04L 65/4015; H04L 67/12; H04L 67/04; H04L 67/125; G06F 17/30887; G06F 16/9566
See application file for complete search history.

(56) References Cited

U.S. PATENT DOCUMENTS

| 718,064 A | 1/1903 | White |
| 5,483,261 A | 1/1996 | Yasutake |

(Continued)

FOREIGN PATENT DOCUMENTS

| EP | 2430833 A2 | 3/2012 |
| JP | 2000163031 A | 6/2000 |
| JP | 2002342033 A | 11/2002 |

OTHER PUBLICATIONS

Lee, S.K. et al. (April 1 985). "A Multi-Touch Three Dimensional Touch-Sensitive Tablet", Proceedings of CHI: ACM Conference on Human Factors in Computing Systems, pp. 21-25.

(Continued)

*Primary Examiner* — Boris D Grijalva Lobos
*Assistant Examiner* — Timothy Sowa
(74) *Attorney, Agent, or Firm* — DICKINSON WRIGHT RLLP

(57) ABSTRACT

Embedding a reduced-content application bundle (a "reduced app bundle") such as a video overlay reduced app bundle into a media stream, and launching that reduced app bundle over a network connection without first performing a substantial downloading and installation of the software on the device is disclosed.

20 Claims, 15 Drawing Sheets

Related U.S. Application Data

(60) Provisional application No. 62/057,656, filed on Sep. 30, 2014.

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 5,931,908 | A | 8/1999 | Gerba et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,663,607 | B2 | 2/2010 | Hotelling et al. |
| 8,214,429 | B2 | 7/2012 | Chidel et al. |
| 8,479,122 | B2 | 7/2013 | Hotelling et al. |
| 8,526,782 | B2 | 9/2013 | Kaiser et al. |
| 8,775,501 | B2 | 7/2014 | Chidel et al. |
| 8,935,666 | B2 | 1/2015 | Miller, III |
| 8,978,075 | B1 | 3/2015 | Kaiser et al. |
| 8,997,007 | B1* | 3/2015 | Bennett ............ H04N 21/41407 715/753 |
| 9,031,382 | B1 | 5/2015 | Kaiser et al. |
| 10,231,033 | B1 | 3/2019 | Bumgarner et al. |
| 2002/0042920 | A1 | 4/2002 | Thomas et al. |
| 2003/0033449 | A1* | 2/2003 | Frantz ................ H04N 21/8193 348/E5.002 |
| 2003/0110171 | A1 | 6/2003 | Ozer et al. |
| 2004/0267940 | A1* | 12/2004 | Dideriksen ......... G06F 9/44526 709/228 |
| 2005/0138137 | A1 | 6/2005 | Encarnacion et al. |
| 2005/0273515 | A1 | 12/2005 | Bodlaender |
| 2006/0197753 | A1 | 9/2006 | Hotelling |
| 2007/0022463 | A1 | 1/2007 | Kelly |
| 2007/0192818 | A1* | 8/2007 | Bourges-Sevenier ...................... H04N 21/84 725/132 |
| 2007/0263860 | A1 | 11/2007 | Buchen et al. |
| 2008/0015932 | A1 | 1/2008 | Haeuser et al. |
| 2008/0034392 | A1 | 2/2008 | McCarthy et al. |
| 2009/0055742 | A1 | 2/2009 | Nordhagen |
| 2009/0259957 | A1 | 10/2009 | Slocum et al. |
| 2009/0317061 | A1 | 12/2009 | Jung et al. |
| 2009/0320066 | A1* | 12/2009 | Soldan ................ H04N 21/4786 725/37 |
| 2010/0014825 | A1 | 1/2010 | Curtis et al. |
| 2010/0046752 | A1 | 2/2010 | Fahrny et al. |
| 2010/0259559 | A1 | 10/2010 | Schneider |
| 2010/0293190 | A1 | 11/2010 | Kaiser et al. |
| 2011/0231519 | A1* | 9/2011 | Luby .................. H04N 21/2401 709/219 |
| 2011/0252118 | A1* | 10/2011 | Pantos .................. G06F 3/0484 709/219 |
| 2012/0017004 | A1 | 1/2012 | Furbeck |
| 2012/0066673 | A1* | 3/2012 | Miller, III ............... H04L 67/34 717/171 |
| 2012/0117534 | A1 | 5/2012 | Hershenson et al. |
| 2012/0185532 | A1 | 7/2012 | Kristiansson et al. |
| 2012/0254365 | A1* | 10/2012 | Adimatyam ..... H04N 21/64322 709/219 |
| 2012/0254454 | A1* | 10/2012 | Margush .................. H04N 7/15 709/231 |
| 2013/0014155 | A1 | 1/2013 | Clarke et al. |
| 2013/0166655 | A1 | 6/2013 | Martin |
| 2013/0254664 | A1* | 9/2013 | Almstrand ............. G11B 27/36 715/716 |
| 2013/0311595 | A1 | 11/2013 | Milatinovici et al. |
| 2014/0007057 | A1 | 1/2014 | Gill et al. |
| 2014/0122738 | A1 | 5/2014 | Thang et al. |
| 2014/0181858 | A1 | 6/2014 | Kitazato |
| 2014/0195653 | A1 | 7/2014 | Alexander et al. |
| 2014/0244803 | A1 | 8/2014 | Kang et al. |
| 2014/0344804 | A1* | 11/2014 | Ein-Gal .................. H04L 67/10 717/177 |
| 2015/0040160 | A1 | 2/2015 | Melnychenko et al. |
| 2015/0264429 | A1 | 9/2015 | Winograd et al. |
| 2015/0289019 | A1 | 10/2015 | Merzon et al. |
| 2015/0372820 | A1 | 12/2015 | Schneider et al. |
| 2016/0127781 | A1 | 5/2016 | Park |
| 2016/0241617 | A1 | 8/2016 | Jelley et al. |

OTHER PUBLICATIONS

Rubine, D. H. (Dec. 1991). "The Automatic Recognition of Gestures," CMU-CS-91-202, submitted in Partial Fulfillment of the Requirements for the Degree of Doctor of Philosophy in Computer Science at Carnegie Mellon University, 285 pages.
Rubine, D. H. (May 1992). "Combining Gestures and Direct Manipulation", CHI '92, pp. 659-660.
U.S. Appl. No. 61/924,200, filed Jan. 6, 2014, by Kaiser et al. (copy not attached).
Westerman, W. (Spring 1999). "Hand Tracking, Finger I identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action mailed Oct. 15, 2015, for U.S. Appl. No. 14/700,076, filed Apr. 29, 2015, fifteen pages.
Non-Final Office Action mailed Mar. 25, 2016, for U.S. Appl. No. 14/812,976, filed Jul. 29, 2015, 17 bages.
Final Office Action mailed Jun. 16, 2016, for U.S. Appl. No. 14/700,076, filed Apr. 29, 2015, 33 pages.
Non-Final Office Action mailed Sep. 9, 2016, for U.S. Appl. No. 14/814,193 , filed Jul. 30, 2015, 13 pages.
Non-Final Office Action mailed Dec. 30, 2016, for U.S. Appl. No. 14/812,976, filed Jul. 29, 2015, 20 pages.
Non-Final Office Action mailed Mar. 23, 2017, for U.S. Appl. No. 14/814,230, filed Jul. 30, 2015, 11 pages.
Non-Final Office Action mailed May 16, 2017, for U.S. Appl. No. 14/700,076, filed Apr. 29, 2015, 41 pages.
Final Office Action mailed May 18, 2017, for U.S. Appl. No. 14/814,193, filed Jul. 30, 2015, 13 pages.
Final Office Action mailed Oct. 13, 2017, for U.S. Appl. No. 14/812,976, filed Jul. 29, 2015, 24 pages.
Final Office Action mailed Nov. 28, 2017, for U.S. Appl. No. 14/814,230, filed Jul. 30, 2015, 16 pages.
Non-Final Office Action mailed Dec. 29, 20 17, for U.S. Appl. No. 14/814,193, filed Jul. 30, 2015, 14 pages.

* cited by examiner

DELIVERY OF APPS IN A MEDIA STREAM

CROSS REFERENCE TO RELATED APPLICATIONS

This application is a continuation of U.S. patent application Ser. No. 14/814,287 filed Jul. 30, 2015, entitled "DELIVERY OF APPS IN A MEDIA STREAM," set to issue Jul. 7, 2020 as U.S. Pat. No. 10,708,391, which claims the benefit of U.S. Provisional Application No. 62/057,656 filed on Sep. 30, 2014, entitled "DELIVERY OF APPS IN A MEDIA STREAM," the entire disclosures of which are herein incorporated by reference for all purposes.

FIELD

This relates generally to a media stream, and more particularly, to the embedding of reduced-content application bundles ("reduced app bundles") into the media stream, and the launching of those reduced app bundles.

BACKGROUND

To run software such as a mobile app on a device, a user typically has to download a copy of the app from an app store on a network and install it locally before the app can be used. The downloading and installation process typically requires a certain amount of time and, once downloaded, the app typically occupies a portion of the local storage space on the device, even when it is not in use. The delay that results from the downloading and installation process is exacerbated when an app is needed in real time, such as during the delivery of a media stream.

SUMMARY

Some embodiments of the disclosure are directed to embedding a reduced-content application bundle (a "reduced app bundle") such as an overlay reduced app bundle into a media stream, and launching that reduced app bundle over a network connection without first performing a substantial downloading and installation of software on the device.

DETAILED DESCRIPTION

In the following description, reference is made to the accompanying drawings in which it is shown by way of illustration some embodiments of the disclosure that can be practiced. It is to be understood that other embodiments can be used and structural changes can be made without departing from the scope of the various embodiments.

Digital distribution is the delivery of media such as television shows, movies, sports, games, music, and other video or audio programming in a digital format. A video program, for example, often contains a number of events (significant moments or periods of time) such as the start and end of the program, the first appearance of a character, an advertisement, an important plot development, and the like. Events often define regions or intervals of time, such as the beginning and end of a particular scene. Such events are optionally referred to as region-based events, which are different from time-based events (which define discrete moments in time). Although region-based events define regions of time, the region of time is optionally, in some instances, so short as to practically define a discrete moment in time. A user's viewing experience can be enhanced by the presentation of additional content during these events, and therefore events can define moments in time when an overlay should be displayed. An overlay is content that is displayed over program images at some point during an event, and can include text, images, video, selection menus, and the like. The overlay can be partially see-through, such that it does not completely obscure the image beneath it.

Figure 1:
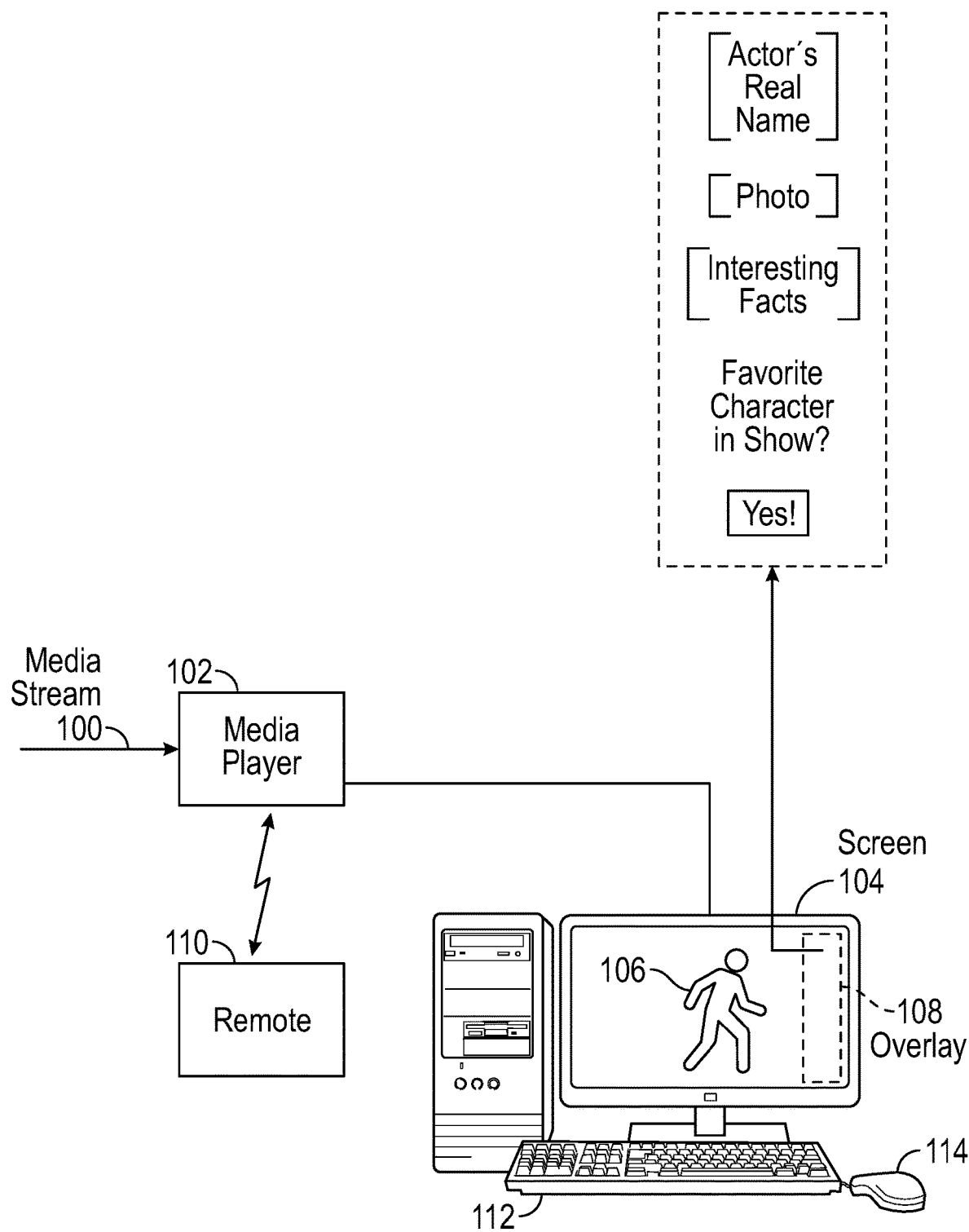
FIG. 1 illustrates an exemplary media stream viewing situation according to some embodiments of the disclosure.

FIG. 1 illustrates an exemplary viewing situation according to some embodiments of the disclosure. In the example of FIG. 1, a media stream 100 received by media player 102 is viewed on screen 104. The media stream 100 is digital data that optionally includes streaming video from online providers (e.g., Netflix, YouTube, Hulu, iTunes, HBO, etc.) or live TV (e.g., cable providers, satellite providers, applications such as MLB.com, NFL.com, NBA.com, NHL.com, etc.), and also optionally includes music, still images, games, and the like. In this example viewing situation, at some point during the program, a character 106 appears on the screen, defining the start of an event. During this event, an overlay 108 optionally appears on the right side of the screen, providing information that is optionally related to the event. In the example of FIG. 1, the overlay provides the actor's real name, a photo, and interesting facts.

Optionally, the overlay 108 is an interactive "voting overlay" that provides a voting menu or mechanism through which a vote can be cast by a viewer operating remote control 110 or other input device such as keyboard 112 or mouse 114. In the example of FIG. 1, the overlay provides a virtual button that allows a viewer to cast a vote for that character as their favorite character in the program. An overlay application associated with the displayed overlay then optionally provides the viewer's vote to the creator of the program content or the distributor of the content, queries the content creator or distributor, and/or provides voting results in "real time" with respect to the location of the playhead within the program.

Although the example of FIG. 1 pertains to video programming, in other examples the digital content may contain music or other audio-only content (e.g., streaming music, concerts, lectures, audio books and the like). In those examples, the program content can also contain events that can trigger the presentation of additional audio content to enhance a user's listening experience, or the presentation of video content along with the audio content. Although examples of the disclosure may be primarily discussed in the context of digital video media for the purpose of brevity, it should be understood that the embodiments of the disclosure are not so limited, but are also applicable to digital audio media.

An overlay application is software that is executed by the media player 102 so that the overlay 108 can be displayed on the screen. It should be understood that the overlay is the actual content to be displayed, while the overlay application is the code or software that controls, defines and/or generates the appearance of the overlay. Due to the real-time nature of the media stream, overlay applications and the overlays they generate need to be ready for execution when triggered by an event. However, it can be inconvenient to pre-download an overlay app, or determine that an overlay app is available, before it is actually needed.

Figure 2:
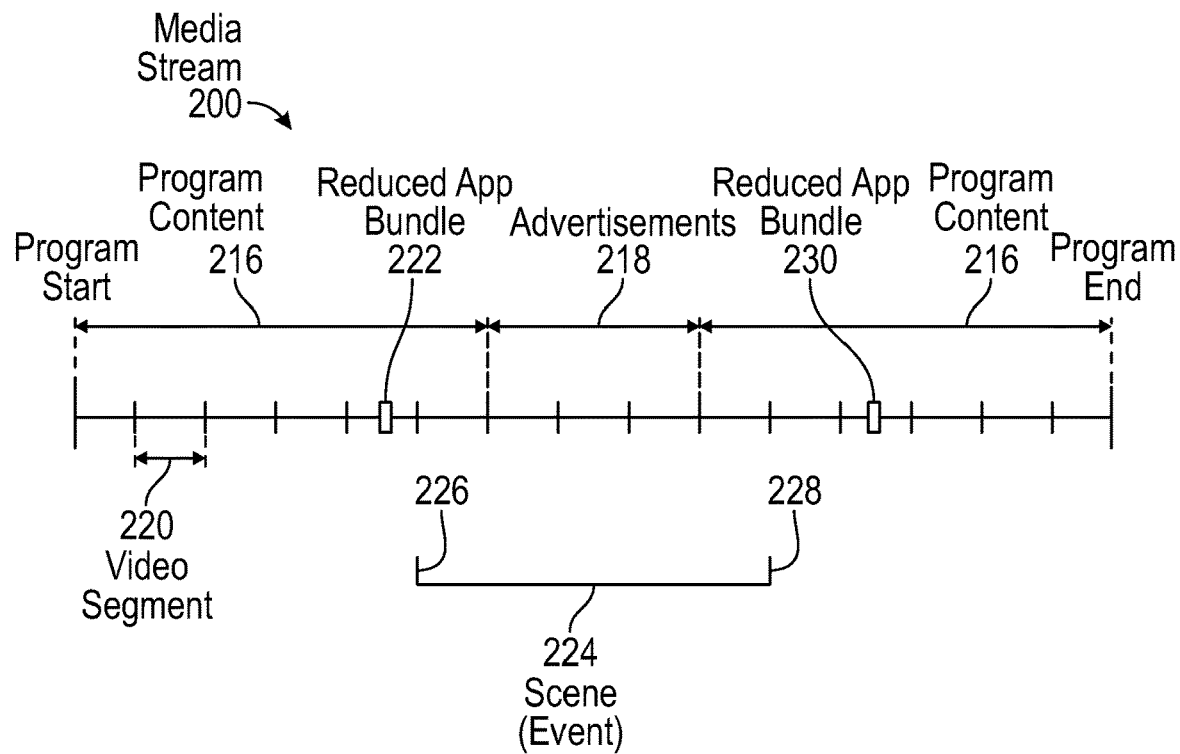
FIG. 2 illustrates an exemplary media stream made up of video segments according to some embodiments of the disclosure.

FIG. 2 illustrates an exemplary media stream 200 made up of video segments 220 according to some embodiments of the disclosure. As illustrated in the example of FIG. 2, a media stream 200 optionally includes program content 216, advertisements 218, and one or more reduced-content application bundles (reduced app bundles) 222 and 230. In the description of some embodiments of the disclosure that follow, embedding a reduced app bundle, such as an overlay reduced app bundle directly into a media stream, and launching that overlay reduced app bundle over a network connection without first performing a substantial downloading and installation of software on the device will be described.

Downloading and installing a conventional app on a client device (e.g., a tablet computer) can be relatively tedious due to the relatively large size of a conventional app—this may negatively affect user experience. This can be particularly true in streaming media situations, where the app may be needed in real time. For example, a user may have to wait for the app to finish being downloaded and installed before he can run the app. This delay can be substantial if the app being downloaded and installed is large. To avoid this delay, apps can be pre-downloaded, or a user can determine in advance if the app is available, but it can be inconvenient to pre-download an app or determine that an app is available before it is needed.

Some embodiments of the disclosure are directed to dynamically executing a software application (e.g., an app on a device) over a network connection without first performing a full local installation of the software on the device. More specifically, a relatively small, reduced-content software bundle (a reduced app bundle) is optionally obtained directly from a media stream or from a playlist associated with the media stream. The reduced app bundle optionally includes a minimum amount of information including, in some embodiments, a bundle ID and a uniform resource locator (URL) to launch the app on the device. The reduced app bundle is different from those used for installing a conventional app (e.g., a binary app) in that it includes no (or a reduced number of) program files such as object codes, libraries, and executables that are typically included in a conventional app bundle and installed locally on the device (i.e., client side) to run the app. Instead of downloading all the required client-side programs and performing a full installation on the device, as would be necessary for a conventional app, the reduced app bundles are optionally dynamically launched by creating a new context with the URL, connecting to a server via the URL from the reduced app bundle, downloading and executing run-time codes (e.g., JavaScript (JS)) to pull the required program logic and/or content from the server, and formatting and presenting the content using a separate process on the device or using a video displaying process running on the device. In some embodiments, creating a new context with the URL involves creating a context object that manages various aspects of the lifecycle for a given URL-based application, such as defining an available memory space for the application and/or various permissions for the application. In some embodiments, a single process optionally creates multiple context objects, each with a different URL. In some embodiments, formatting and presenting the content involves using the dynamically-pulled logic/contents, as well as using templates that are optionally pre-loaded on the device.

Because the reduced app bundle disclosed in some embodiments of the disclosure is optionally significantly smaller in size than a conventional app, it optionally allows for a faster download and installation than a conventional app. At the same time, from a user (or the client device's) perspective, the process of browsing for the app (where applicable), downloading and running the app on the client device optionally appears largely the same as that of installing and running a conventional app. This can provide a universal and consistent app-using experience for the user regardless of the type of app and/or platform being used to access the app.

It should also be understood that some embodiments of the disclosure are not limited to the specific programming languages/tools (client side and/or server side), application programming interfaces (APIs), operating systems, computing platforms, client devices, servers, and networks, etc., described herein. In some embodiments, the app is optionally any type of software capable of running on a computing device. Such software optionally includes, but is not limited to, apps such as Netflix and Hulu Plus that are capable of feeding multimedia content to the client devices. The apps optionally run on different types of devices, such as mobile devices (e.g., iPhones, Android devices, Windows devices) and digital media players (e.g., Apple TV and Roku). The devices optionally support various platforms and operating systems (iOS, Android, Windows). The client device is optionally any of the devices mentioned above, but is not limited to those devices. The server is optionally any computer accessible via a network by the client device(s) from which information such as apps and/or content is optionally downloaded. Exemplary networks for connecting the server and client(s) optionally include, but are not limited to, the Internet, local area network (LAN), wide area network (WAN), virtual private network (VPN), etc. Although JavaScript and XML are mentioned in some embodiments as exemplary programming languages that are optionally used for coding the disclosed methods and systems, it should be understood that other programming languages are optionally used for achieving the same purpose.

In some embodiments of the disclosure, reduced app bundles that are embedded in a media stream include a URL (the URL from which code for the app, such as Javascript (JS), will be retrieved) and optionally one or more of vendor and chapter identifiers, artwork, entitlements (e.g., keychain entitlements, iCloud entitlements), eligibility parameters, push notification parameters, and other metadata.

In some embodiments of the disclosure, the reduced app bundles are optionally included in timed metadata, which is encoded and embedded directly into the video stream so that it becomes part of the video stream. The media player optionally detects the timed metadata containing the reduced app bundles by looking for a trigger in the video stream, and reads this metadata out separately from the decoding of the video. The trigger is optionally an event, closed caption data or the like, embedded in the media stream.

Figure 3:
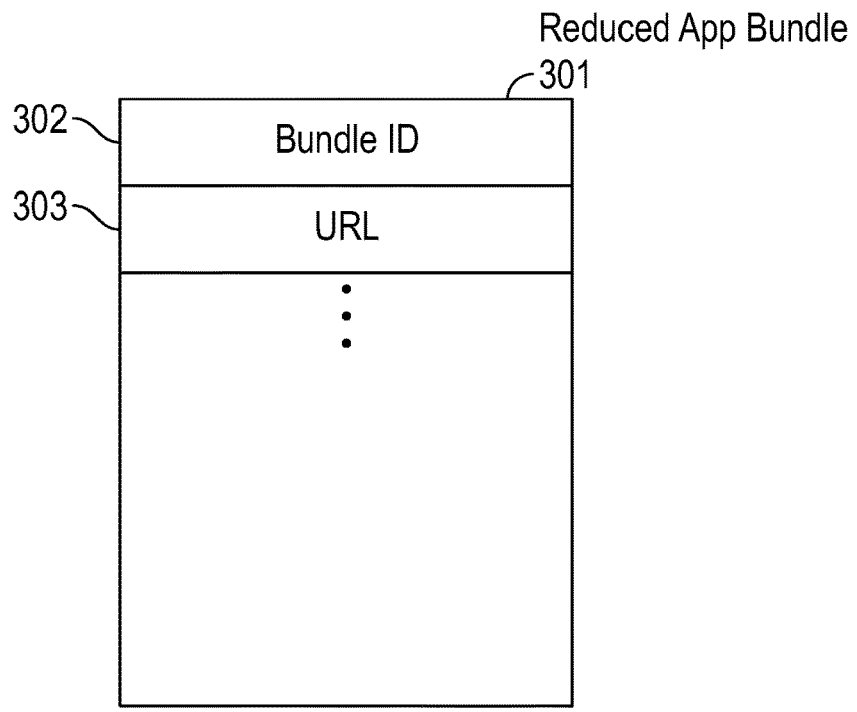
FIG. 3 illustrates an exemplary structure of a reduced app bundle according to some embodiments of the disclosure.

FIG. 3 illustrates an exemplary structure of a reduced app bundle 301 according to some embodiments of the disclosure. Reduced app bundle 301 optionally includes an identifier, such as a bundle ID 302, and optionally an App ID. In contrast to a conventional app bundle, reduced app bundle 301 optionally does not need to include any program files such as Mach-O files that may be needed for a full-scale client-side installation. Instead, reduced app bundle 301 includes a root URL 303 associated with the app. The root URL 303 identifies the location of a server from which additional information is optionally provided dynamically to the client device for running the app. The additional information optionally includes, for example, program logic that optionally determines, for example, the format in which contents are presented on the client device and the actual contents to be fed to the client device once the app is up and running. Although not shown in FIG. 3, reduced app bundle 301 optionally includes an app icon, vendor and chapter identifiers, artwork, entitlements, eligibility and other information relating to the app. Because reduced app bundle 301 optionally does not need to include any program files to be installed on the client device, the size of the bundle 301 can be significantly smaller than a conventional app bundles. As such, reduced app bundle 301 can be retrieved relatively quickly from a media stream or remote server, if needed.

In some embodiments of the disclosure, the reduced app bundles are optionally sandboxed, such that the reduced app bundles optionally run within a constrained environment with limited capabilities such as limits on folder access, and limits on where data is written. Other characteristics of running an app in a sandboxed environment, such as memory access limitations, are also within the scope of the disclosure.

In some embodiments of the disclosure, the reduced app bundles are optionally code signed. Code signing is the process of digitally signing executables and scripts to confirm the software author and guarantee that the code has not been altered or corrupted. In some embodiments, a media player or other device optionally looks only for code signed reduced app bundles and ignores all other URLs and other metadata. Accordingly, in some embodiments, the process of code signing reduced app bundles allows them to be securely transferred from the media stream to a device, and then opened.

As mentioned above, in some embodiments, reduced app bundles are optionally embedded directly into a media stream as (or as part of) timed metadata. Referring again to the example of FIG. 2, a media stream 200 that makes up a program to be viewed optionally contains a number of video segments 220 that need to be played back seamlessly, in the proper order, to provide the proper viewing experience. The media stream 200 optionally includes program content 216 and advertisements 218, and in some instances, closed caption data. The program content 216 and advertisements 218 are optionally formed from the video segments 220. Each video segment 220 optionally contains a pointer to the next video segment in the sequence. The media stream optionally includes one or more reduced app bundles 222 and 230 that are embedded directly into the media stream as timed metadata and are optionally located between the video segments or within the video segments. These reduced app bundles are optionally signified by metadata and/or metadata triggers that are optionally detected by a metadata manager that optionally continuously monitors the media stream. The launching of such reduced app bundles will be described later.

Figure 4:
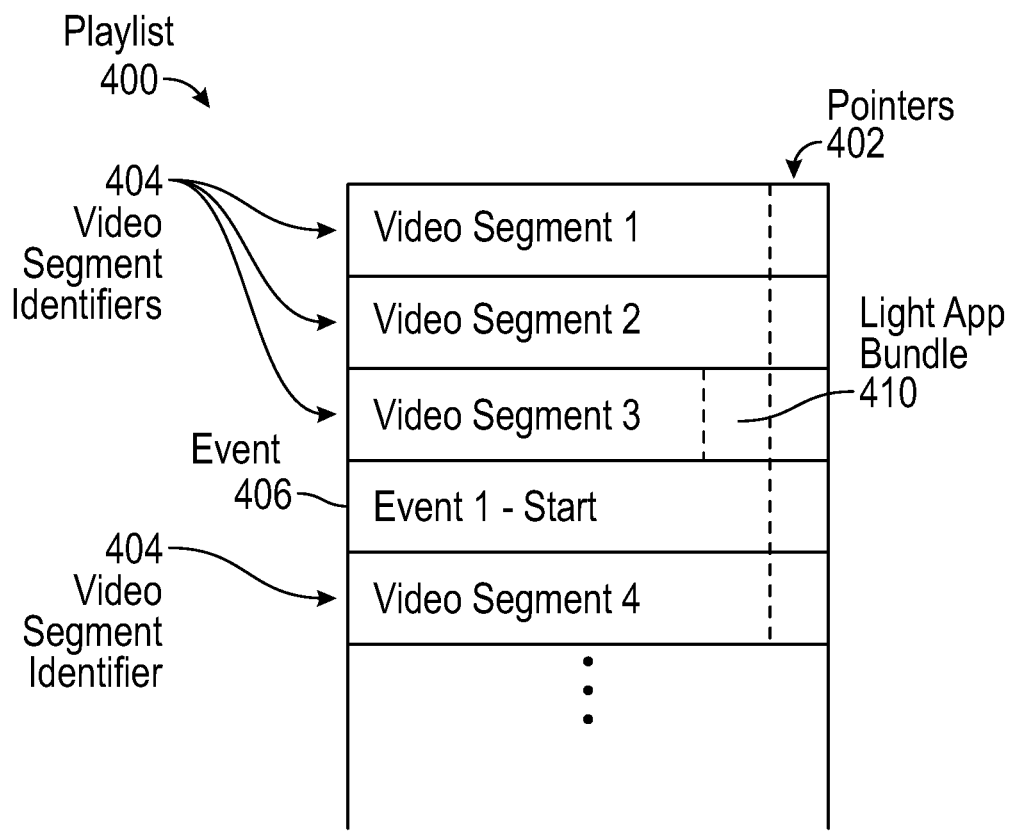
FIG. 4 illustrates an exemplary playlist containing a reduced app bundle according to some embodiments of the disclosure.

In some embodiments of the disclosure, reduced app bundles are optionally included in a playlist as (or as part of) region-based metadata. FIG. 4 illustrates an exemplary playlist 400 according to some embodiments of the disclosure. As illustrated in the example of FIG. 4, a playlist 400 is optionally a text file that optionally contains a list of video segment identifiers 404 including pointers 402 to the video segments that need to be retrieved and played. Video segment identifiers 404 and pointers 402 optionally correspond to video segments 220 in FIG. 2. Each video segment identifier 404 is optionally further identified by a video segment number. In some embodiments, this playlist 400 is optionally separate from the media stream, and in some embodiments, this playlist is optionally embedded in the media stream. Using the pointers in the playlist 400, the actual video segments are optionally stitched together seamlessly so that even during transitions between video segments, the playback can appear seamless. The playlist is optionally also used to play, pause, rewind and fast-forward through the media stream.

A video program optionally contains a number of events (significant moments or periods of time) such as the start and end of the program, the first appearance of a character, an advertisement, an important plot development, and the like. Events optionally define regions or intervals of time when an overlay should be displayed, when other information or video should be displayed, or when user preferences or parental controls are optionally selected and activated, among other things. Overlays are UIs that are optionally displayed alongside or over video content, are optionally interactive or static, and optionally include information (letters, words, phrases, facts, questions, videos, animations, photos, interactive (e.g., clickable) boxes, fill-in boxes, and the like) related to the content, an associated event, etc. Referring again to the example of FIG. 2, event 224 represents a particular scene including the start of the scene 226 and end the scene 228, to illustrate just one example. In some embodiments, the same event optionally occurs multiple times within a single program.

According to some embodiments of the disclosure, in order to allow downstream recipients to take advantage of the opportunities presented by events, metadata is optionally added to the playlist that optionally identifies a region-based event, optionally defines the time at which these events occur, and optionally specifies other information relevant to the event, such as a reduced app bundle to be launched during that event. For example, metadata is optionally added to the playlist by a content creator to indicate that a particular event begins a certain time after the start of a particular video segment, has a particular time duration, and that a reduced app bundle (included in the playlist) should be launched at a certain time during the event. In some embodiments, the events including the reduced app bundles and other metadata are optionally inserted into the playlist between the video segment identifiers, though it is understood that the events optionally reside in an area of the playlist separate from the video segment identifiers. In the example of FIG. 4, the start of an event has been added between video segment identifier 3, which contains reduced app bundle 410, and video segment identifier 4. In the example of FIG. 4, the reduced app bundle 410 is associated with an event whose start is indicated in the playlist at 406, and is therefore placed in the playlist before the event start indicator 406, so that it can be launched in advance of the event. In some embodiments, the launching of the reduced app bundle 410 optionally causes an overlay to be displayed during the event. The launching of such reduced app bundles 410 will be described later.

Figure 5:
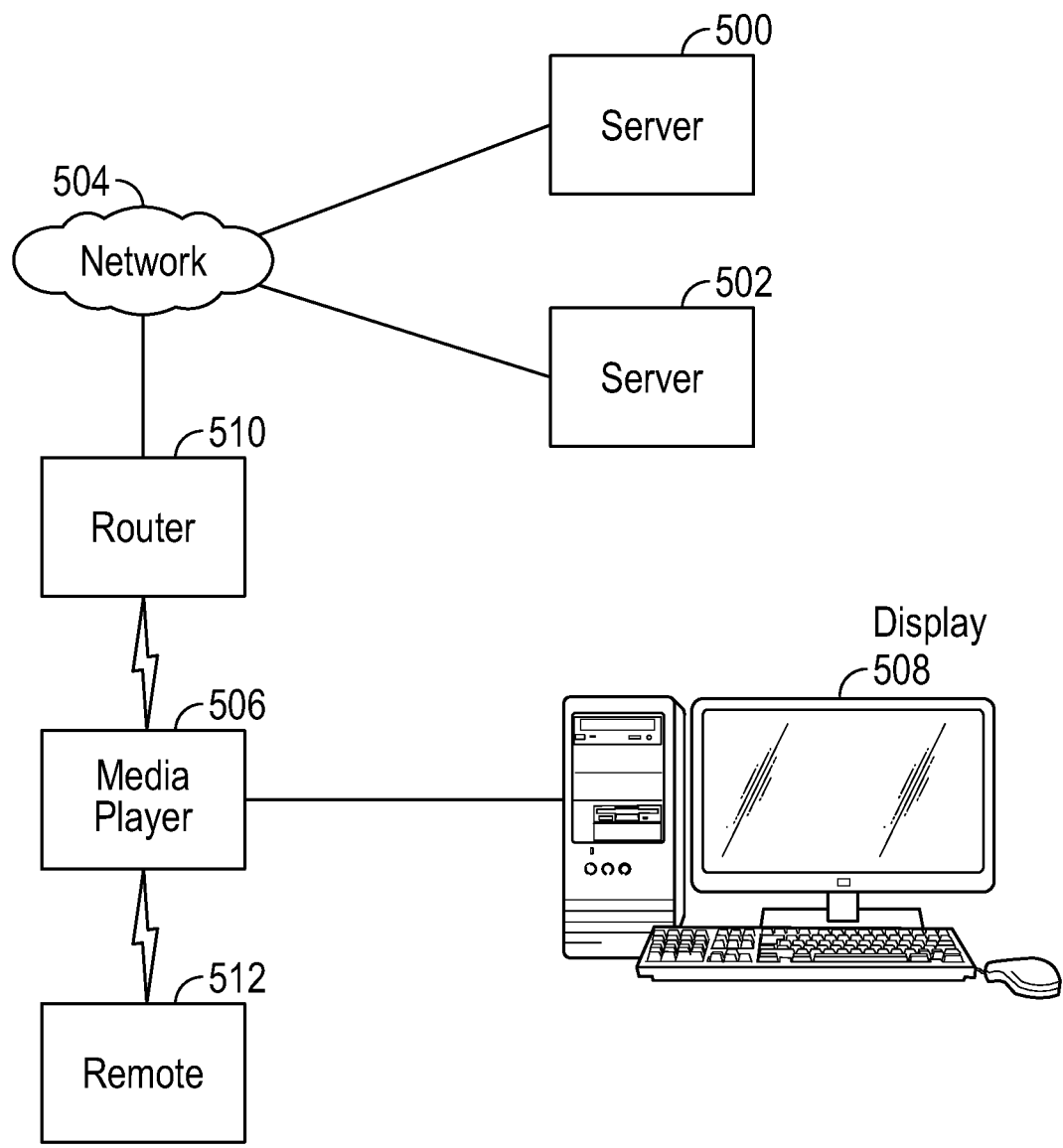
FIG. 5 illustrates an exemplary network connecting various devices, according to some embodiments of the disclosure.

FIG. 5 illustrates an exemplary network connecting various devices, according to some embodiments of the disclosure. As illustrated, the devices optionally include server 500 which provides the media content, server 502 which optionally hosts program logic and/or content required by the reduced app bundles, and a digital media player 506 (e.g., Apple TV) for playing the media content (e.g., movies, TV shows, songs) obtained from server 500 on a display device 508. The digital media player 506 is optionally connected to a network 504 through a router 510, and optionally also includes a remote 512 to provide user input. The display device is optionally a built-in display of the digital media player 506 or an external display (e.g., a monitor or TV) connected to the digital media player 506. The servers 500, 502, and digital media player 506 are optionally connected to each other via network 504. Although only one digital media player 506 is shown in FIG. 5, it should be understood that additional digital media players and/or other client devices are optionally connected to the same network 504. In some embodiments of the disclosure, servers 500 and 502 are optionally the same server that provides both the media stream and the program logic and content required by the reduced app bundles. In some embodiments, servers 500 and 502 are optionally separate devices controlled by the same or different entities.

In some embodiments of the disclosure, a reduced app bundle is optionally embedded directly into the media stream as (or as part of) timed metadata, or as an app (e.g., Netflix, Hulu apps) for streaming multimedia content to the digital media player 506, or is optionally included in a playlist separate from the media stream. The speed at which a user can access content can be particularly important for reduced app bundles added to a video stream, or apps such as the Netflix or Hulu apps, because the user typically wants to run the app and start viewing the overlay or contents with minimum delay. Accordingly, performing a full download and installation of the app before running it on the device (e.g., like a conventional app) may take too long and, thus, may negatively affect the user's viewing experience.

In some embodiments of the disclosure, the reduced app bundle is optionally launched within the process that is receiving and displaying the media stream, but in some embodiments the reduced app bundle is launched as a separate process hosted on top of the video displaying process. If the reduced app bundle is executed as a separate process, any display or view from the separate process is optionally hosted and controlled by the video displaying process. For example, in some embodiments, if a full scale display is desired for the reduced app bundle, the reduced app bundle is optionally executed as a separate process from the video displaying process. However, in some embodiments, if an overlay over the video is desired, the reduced app bundle is optionally run within the video displaying process.

In some embodiments of the disclosure, when a reduced app bundle is detected in the media stream or in the playlist, a process optionally launches the reduced app bundle immediately, although there may be nothing to immediately display. In some embodiments, the reduced app bundle is optionally running in the background, and when certain metadata is detected in the stream, any views directed by the reduced app bundle appear. In some embodiments, when a reduced app bundle is detected in the media stream, additional metadata optionally also provides launch criteria, which optionally prevents the reduced app bundle from launching immediately. In some embodiments, when the launching of a reduced app bundle is intentionally delayed, it is optionally dynamically linked to an executable that is already located in the device, and is launched when certain launch criteria are satisfied. In some embodiments the launch criteria is optionally a specific time, a certain type of video, or when a particular event is detected, to name just a few examples. For example, if a reduced app bundle for a voting overlay is detected in the video stream, the reduced app bundle is optionally launched but not yet displayed. When a voting event is detected in a program that encourages voter input, the reduced app bundle optionally displays a voting overlay.

Figure 6:
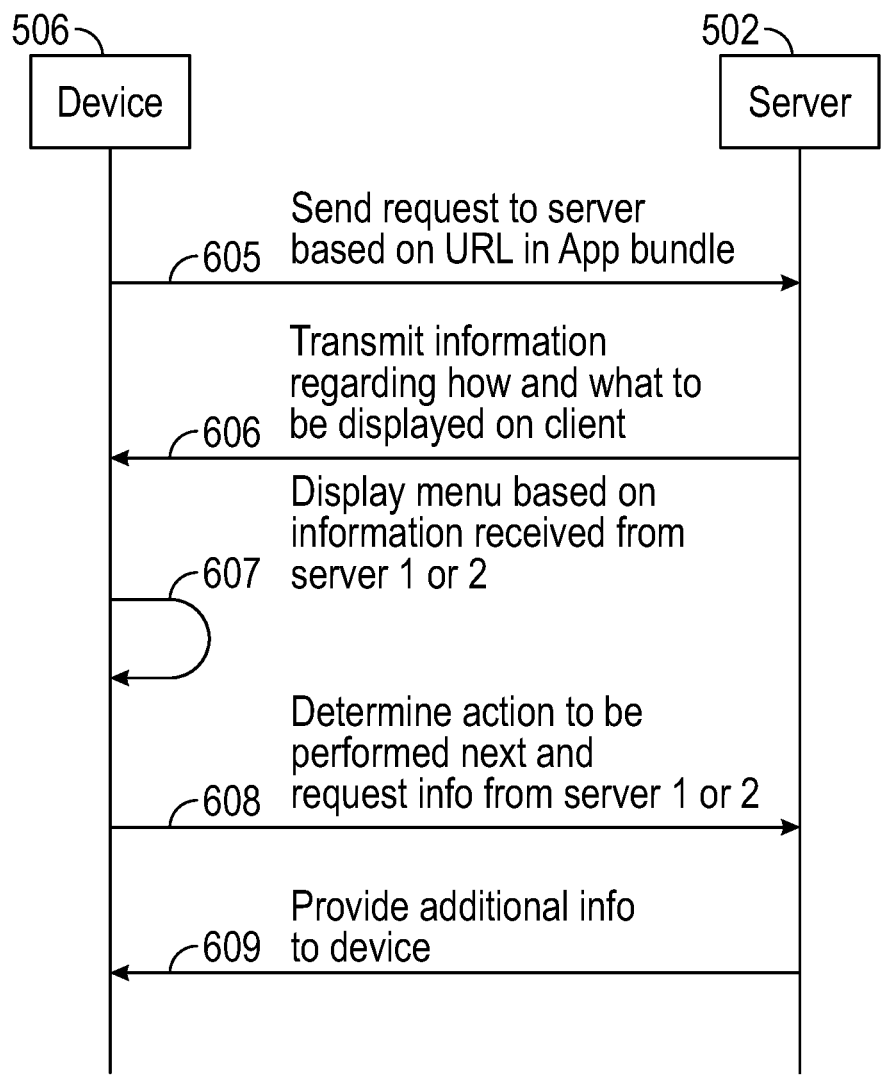
FIG. 6 illustrates an exemplary method for running a reduced app bundle in a media stream according to some embodiments of the disclosure.

FIG. 6 illustrates an exemplary method for running a reduced app bundle in a media stream according to some embodiments of the disclosure. In some embodiments, the reduced app bundle is embedded directly into the media stream as (or as part of) timed metadata, which is optionally received from sources such as live TV, rental or other downloaded content, or from apps such as the Netflix or Hulu app capable of feeding streaming multimedia content to the client device(s). In some embodiments, the reduced app bundle is part of the playlist. However, it should be understood that the disclosed method can be applied to other types of apps or software.

In some embodiments of the disclosure, a process running on the device detects the presence of a reduced app bundle in the media stream, either embedded directly into the media stream as timed metadata or a feed-based app, or in a playlist as region-based metadata. After the reduced app bundle is detected by device 506, the root URL in the reduced app bundle is extracted and a video displaying process running on the device 506 optionally creates a new context with the URL. The device 506 also identifies server 502, based on the URL, as the server from which additional information (e.g., programming logic and contents) for running the app can be retrieved. In some embodiments, the context optionally downloads a JavaScript program linked to the URL and optionally runs the program in a sandboxed environment to request the additional information from server 502 (step 605). In some embodiments, other means or programs are optionally used in place of the JavaScript program to make the same request. In some embodiments, the app is optionally a third-party app (e.g., the Netflix app) and server 502 is a third-party server (e.g., one of Netflix's servers) and the additional information requested is information relating to the format and content specific to the third-party app. In some embodiments, server 502 and server 500 are optionally controlled by the same entity, or optionally are the same server.

In response to the request received from device 506, server 502 optionally provides one or more items to be sent to device 506 for display (or other use) and optionally provides the logic that determines how the item(s) can be displayed in a user interface or otherwise used (step 606). In some embodiments, this information is optionally transmitted in the form of, for example, an Extensible Markup Language (XML) page (or any other suitable markup language). The items to be displayed or otherwise used optionally include, for example, user interface items such as overlays, or menu items for selecting and/or searching for contents for viewing. The logic relating to how these items are displayed optionally determines, for example, which pre-existing template is to be used for displaying the items or a particular overlay or layout specifying the location, size, and order of each of the menu items on the user interface or display of device 506. In some embodiments, the XML page optionally defines the template and/or the user interface elements to fill the template with. In some embodiments, only a limited number of templates are optionally made available to the apps, and customization of the templates is restricted. This optionally minimizes the amount of information needed from server 502 to present, for example, the overlay or menu items on device 506. In addition, this allows the same templates to be made available on different platforms.

The context running in device 506 optionally displays an overlay or menu in a specified template or format with the desired menu items according to the information from the XML page (step 607). Optionally, a user selects one of the displayed menu items and an event handler determines the appropriate action to be performed next in response to the selection (step 608). In some embodiments, the event handler is optionally another JavaScript program. The JavaScript program optionally triggers different actions in response to various user inputs. The one or more JavaScript programs optionally form a JavaScript API, which is optionally available to one or more apps running on device 506. In other words, the JavaScript programs are optionally generic with respect to the different apps and are designed to respond to specific events that are universal to multiple apps. The action to be performed next can be, for example, retrieving a sub-menu from server 502 or requesting actual media contents from server 502 to be displayed on device 500. Server 502 optionally responds accordingly by providing the requested information (step 609).

The exemplary steps shown in FIG. 6 provide a mechanism for running a reduced app bundle without first performing an installation on the client device (e.g., device 506). In other words, no program files such as Mach-O code have to be included in the reduced app bundle and extracted to perform a local installation on the client device. Instead, the process of FIG. 6 involves extracting an URL from the reduced app bundle and establishing communication with a server (e.g., server 502) to retrieve the information such as program logic and contents needed to run the reduced app bundle directly from the server or as a separate process on the client device. This can provide flexibility in that the app only needs to retrieve logic or contents on an as-need basis. While updating a template in an app installed on a client device optionally requires downloading and installing a newer version of the app, in some embodiments the same task is optionally performed dynamically through a relatively simple change to the JavaScript program controlling the template.

In some embodiments of the disclosure, the process of running an app, as illustrated in FIG. 6, is optionally performed entirely within the server 502 without having the app installed separately on the device 506. The app bundle (e.g., reduced app bundle 301) is optionally kept lightweighted due to the lack of program files and thus allows for a quick retrieval. However, from the user's perspective, the process of FIG. 6 can appear to be no different from the process of running a conventional app installed locally on the device, other than that the time required to launch and/or run the app can be much less than for a conventional app.

Figure 7:
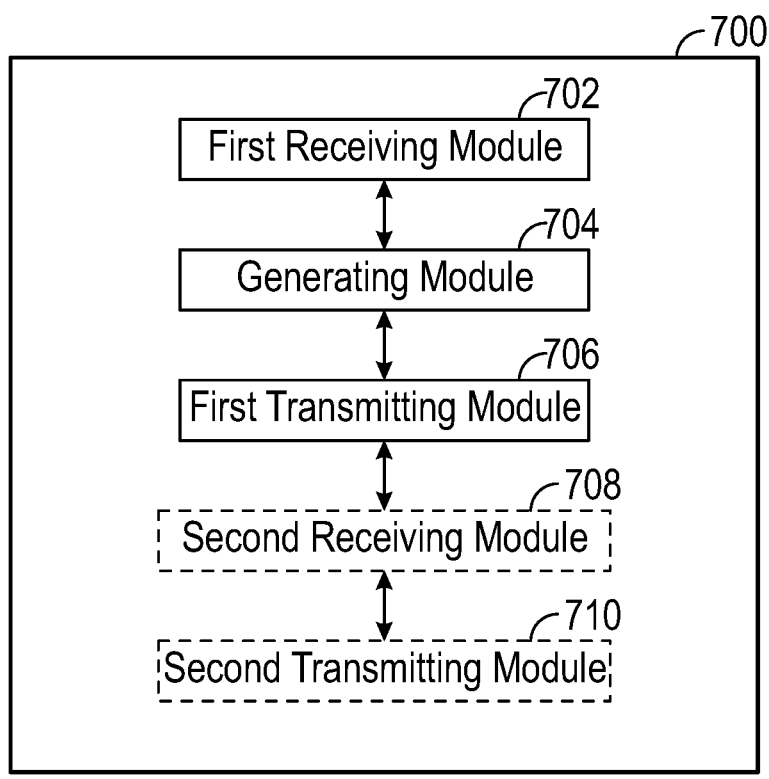
FIG. 7 is a block diagram illustrating exemplary server modules according to some embodiments of the disclosure.

FIG. 7 is a block diagram illustrating the exemplary module of a server 700 such as server 500 of FIG. 5. Server 700 optionally includes, for example, a first receiving module 702, a generating module 704, and a first transmitting module 706 connected to each other. The first receiving module 702 is optionally configured for receiving, from a client (not shown in FIG. 7), a request for initiating the application. The generating module 704 is optionally configured for generating an application bundle including an address of another server (e.g., server 502 of FIG. 5). The address optionally enables a program on the client to request information from the other server (e.g., server 502 of FIG. 5). In some embodiments, the address is optionally a uniform resource locator (URL). The application bundle optionally additionally includes one or more of an application bundle ID, application ID, vendor ID, and entitlements. The application bundle is optionally free of program files for running an installation on the client. The first transmitting module 706 is optionally configured for transmitting the application bundle to the client.

Optionally, as illustrated in FIG. 7, server 700 also includes additional modules such as a second receiving module 708 and a second transmitting module 710. The second receiving module 708 is optionally configured for receiving the request for information from the client. The information optionally includes, for example, programming logic or contents for running the application on the client. The second transmitting module 710 is optionally configured for transmitting the requested information to the client. In some embodiments, the first and second transmitting modules 706, 710 are the same module. Similarly, in some embodiments the first and second receiving modules 702, 708 are the same module.

Figure 8:
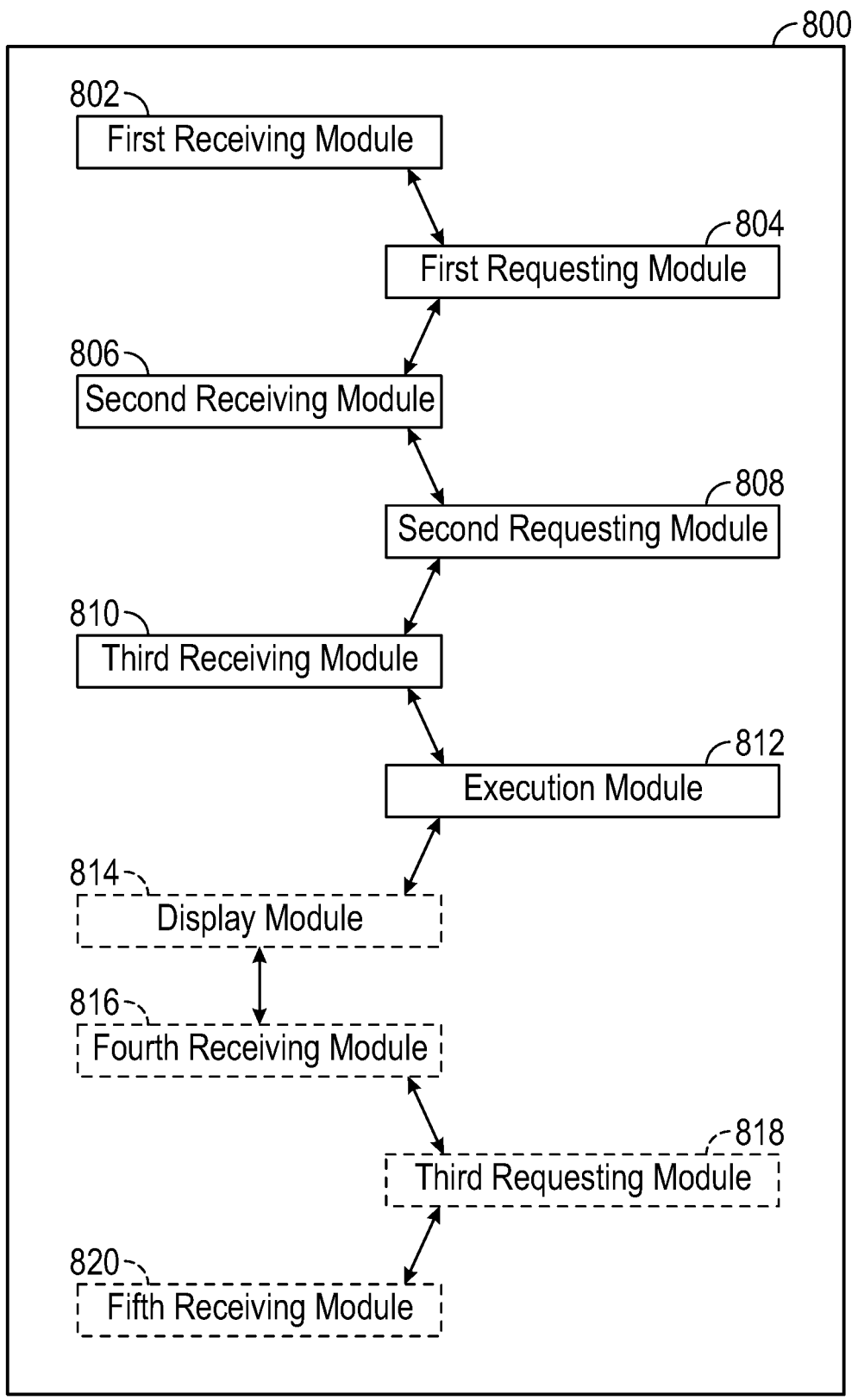
FIG. 8 is a block diagram illustrating exemplary modules of a client device according to some embodiments of the disclosure.

FIG. 8 is a block diagram illustrating the exemplary module of a client device 800 such as the digital media player 506 of FIG. 5. Client device 800 optionally includes, for example, a second requesting module 808, a third receiving module 810, and an execution module 812. Each of these modules is optionally connected to one or more of the other modules. The second requesting module 808 is optionally configured for requesting information from the second server using the URL in the reduced app bundle. The third receiving module 810 is optionally configured for receiving the requested information from the second server. The requested information optionally includes, for example, program logic and/or contents for running the application. The execution module 812 is optionally configured for dynamically executing the application using the received information. For example, the execution module 812 optionally runs the program logic in the received information to determine a template for displaying an overlay or menu items of the app on a display associated with the client device. Additionally or alternatively, the execution module 812 optionally populates the template with the content (e.g., menu items) in the received information.

In some embodiments of the disclosure, client device 800 optionally also includes one or more of the following modules: a displaying module 814, a fourth receiving module 816, a third requesting module 818, and a fifth receiving module 820 connected to each other. The displaying module 814 is optionally configured for displaying an overlay or user interface associated with the reduced app bundle. The fourth receiving module 816 is optionally configured for receiving user input directed to the overlay or user interface. The third requesting module 818 is optionally configured for requesting contents from the second server in response to the user input. The fifth receiving module 820 is optionally configured for receiving the requested content from the second server. In some embodiments, one or more of the second, third, fourth, and fifth receiving modules are optionally the same module. Similarly, one or more of the first, second, and third requesting modules are optionally the same module.

In some embodiments of the disclosure, one or more of the modules of server 700 and/or client 800 are optionally stored and/or transported within any non-transitory computer-readable storage medium for use by or in connection with an instruction execution system, apparatus, or device, such as a computer-based system, processor-containing system, or other system that optionally fetches the instructions from the instruction execution system, apparatus, or device and execute the instructions. In the context of this document, a "non-transitory computer-readable storage medium" is optionally any medium that optionally contains or stores the program for use by or in connection with the instruction execution system, apparatus, or device. The non-transitory computer readable storage medium optionally includes, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 9:
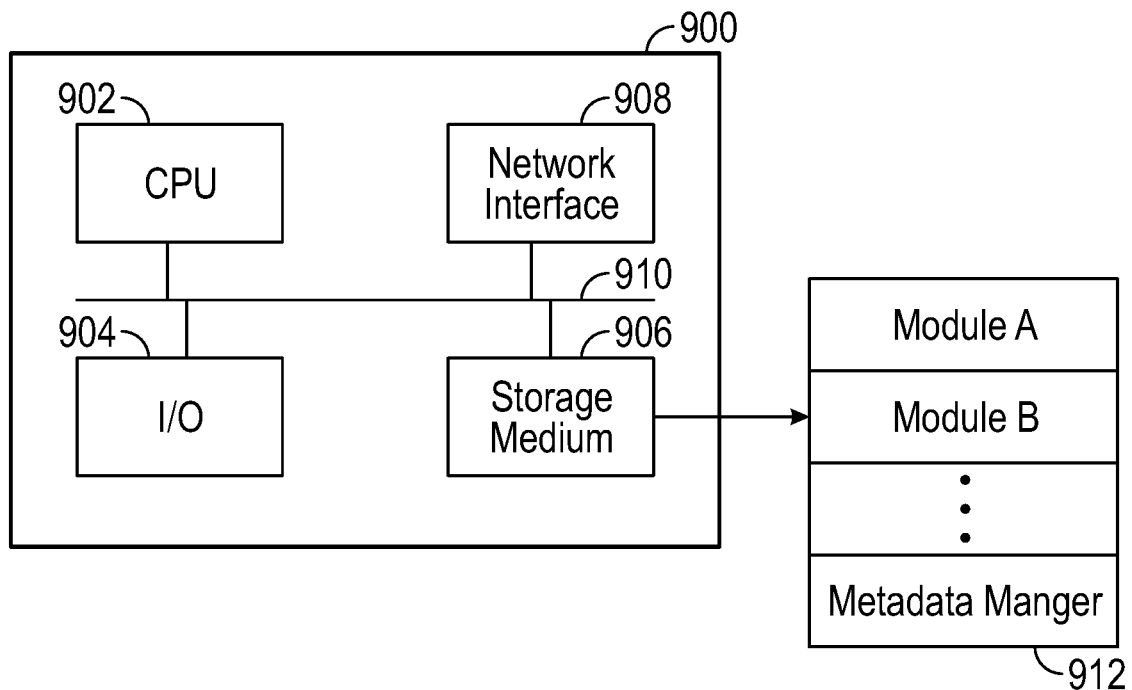
FIG. 9 illustrates an exemplary computing system serving as the server or the client according to some embodiments of the disclosure.

The non-transitory computer readable storage medium is optionally a part of a computing system serving as the server or the client. FIG. 9 illustrates exemplary common components of one such computing system. As illustrated, the system 900 optionally includes a central processing unit (CPU) 902, I/O components 904 including, but not limited to one or more of display, keypad, touch screen, speaker, and microphone, storage medium 906 as described above, and network interface 908, all of which are optionally connected to each other via a system bus 910. The storage medium 906 optionally includes the modules of FIGS. 7 and 8 depending on whether the system is a server or a client. The storage medium 906 optionally also includes a metadata manager 912, which is a program that continuously monitors the media stream, looking for triggers or patterns in the media stream representative of playlists, events, reduced app bundles, advertisement inserts, and other metadata, and optionally extracts and saves this metadata into memory or storage.

One or more Application Programming Interfaces (APIs) are optionally used in some embodiments of the disclosure. For example, one or more the JavaScript programs mentioned in the embodiments above optionally form an API for communicating with one or more of the servers and dynamically requesting and receiving information for the server(s). It should be understood that the API optionally includes additional code in other programming language in lieu of or in addition to the JavaScript programs discussed above.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API optionally defines one or more parameters that are passed between the API-calling component and the API-implementing component.

An API allows a developer of an API-calling component (which is optionally a third party developer) to leverage specified features provided by an API-implementing component. There is optionally one API-calling component or optionally more than one such component. An API is optionally a source code interface that a computer system or program library provides in order to support requests for services from an application. An operating system (OS) optionally has multiple APIs to allow applications running on the OS to call one or more of those APIs, and a service (such as a program library) optionally has multiple APIs to allow an application that uses the service to call one or more of those APIs. An API is optionally specified in terms of a programming language that is interpreted or compiled when an application is built.

In some embodiments the API-implementing component optionally provides more than one API, each providing a different view of or with different aspects that access different aspects of the functionality implemented by the API-implementing component. For example, one API of an API-implementing component optionally provides a first set of functions and is optionally exposed to third party developers, and another API of the API-implementing component is optionally hidden (not exposed) and provides a subset of the first set of functions and also provides another set of functions, such as testing or debugging functions which are not in the first set of functions. In some embodiments the API-implementing component optionally itself calls one or more other components via an underlying API and thus is both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component optionally returns a value through the API in response to an API call from an API-calling component. While the API defines the syntax and result of an API call (e.g., how to invoke the API call and what the API call does), the API optionally does not reveal how the API call accomplishes the function specified by the API call. Various API calls are transferred via the one or more application programming interfaces between the calling (API-calling component) and an API-implementing component. Transferring the API calls optionally includes issuing, initiating, invoking, calling, receiving, returning, or responding to the function calls or messages; in other words, transferring optionally describes actions by either of the API-calling component or the API-implementing component. The function calls or other invocations of the API optionally send or receive one or more parameters through a parameter list or other structure. A parameter is optionally a constant, key, data structure, object, object class, variable, data type, pointer, array, list or a pointer to a function or method or another way to reference a data or other item to be passed via the API.

Furthermore, data types or classes are optionally provided by the API and implemented by the API-implementing component. Thus, the API-calling component optionally declares variables, uses pointers, or uses or instantiate constant values of such types or classes by using definitions provided in the API.

Generally, an API is optionally used to access a service or data provided by the API-implementing component or to initiate performance of an operation or computation provided by the API-implementing component. By way of example, the API-implementing component and the API-calling component is optionally any one of an operating system, a library, a device driver, an API, an application program, or other module (it should be understood that the API-implementing component and the API-calling component is optionally the same or different type of module from each other). API-implementing components are optionally embodied at least in part in firmware, microcode, or other hardware logic. In some embodiments, an API optionally allows a client program to use the services provided by a Software Development Kit (SDK) library. In some embodiments, an application or other client program optionally uses an API provided by an Application Framework. In these embodiments, the application or client program optionally incorporates calls to functions or methods provided by the SDK and provided by the API, or uses data types or objects defined in the SDK and provided by the API. An Application Framework optionally provides a main event loop for a program that responds to various events defined by the Framework. The API allows the application to specify the events and the responses to the events using the Application Framework. In some implementations, an API call optionally reports to an application the capabilities or state of a hardware device, including those related to aspects such as input capabilities and state, output capabilities and state, processing capability, power state, storage capacity and state, communications capability, etc., and the API is optionally implemented in part by firmware, microcode, or other low level logic that executes in part on the hardware component.

The API-calling component is optionally a local component (i.e., on the same data processing system as the API-implementing component) or a remote component (i.e., on a different data processing system from the API-implementing component) that communicates with the API-implementing component through the API over a network. It should be understood that an API-implementing component also optionally acts as an API-calling component (i.e., it optionally makes API calls to an API exposed by a different API-implementing component), and an API-calling component also optionally acts as an API-implementing component by implementing an API that is exposed to a different API-calling component.

The API optionally allows multiple API-calling components written in different programming languages to communicate with the API-implementing component (thus the API optionally includes features for translating calls and returns between the API-implementing component and the API-calling component); however, the API is optionally implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 10:
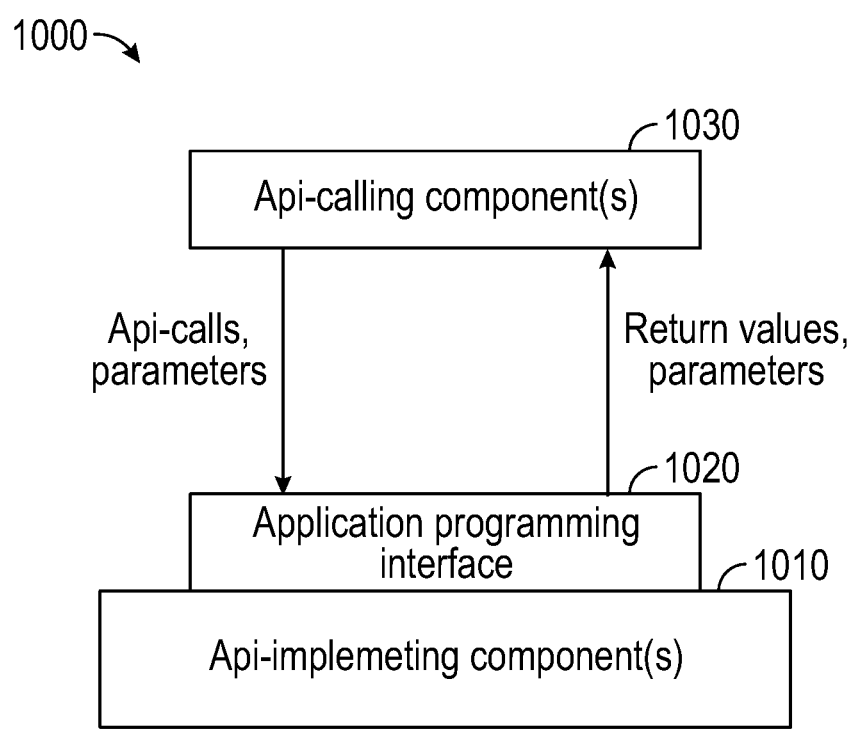
FIG. 10 is a block diagram illustrating an exemplary API architecture according to some embodiments of the disclosure.

FIG. 10 is a block diagram illustrating an exemplary API architecture, which is optionally used in some embodiments of the disclosure. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that is optionally used by the API-calling component 1030. The API 1020 optionally specifies at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1030 optionally returns a value through the API 1020 to the API-calling component 1030 in response to an API call.

It will be appreciated that the API-implementing component 1010 optionally includes additional functions, methods, classes, data structures, and/or other features that are not specified through the API 1020 and are not available to the API-calling component 1030. It should be understood that the API-calling component 1030 is optionally on the same system as the API-implementing component 1010 or is optionally located remotely and accesses the API-implementing component 1010 using the API 1020 over a network. While FIG. 10 illustrates a single API-calling component 1030 interacting with the API 1020, it should be understood that other API-calling components, which are optionally written in different languages (or the same language) than the API-calling component 1030, optionally use the API 1020.

The API-implementing component 1010, the API 1020, and the API-calling component 1030 are optionally stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 11:
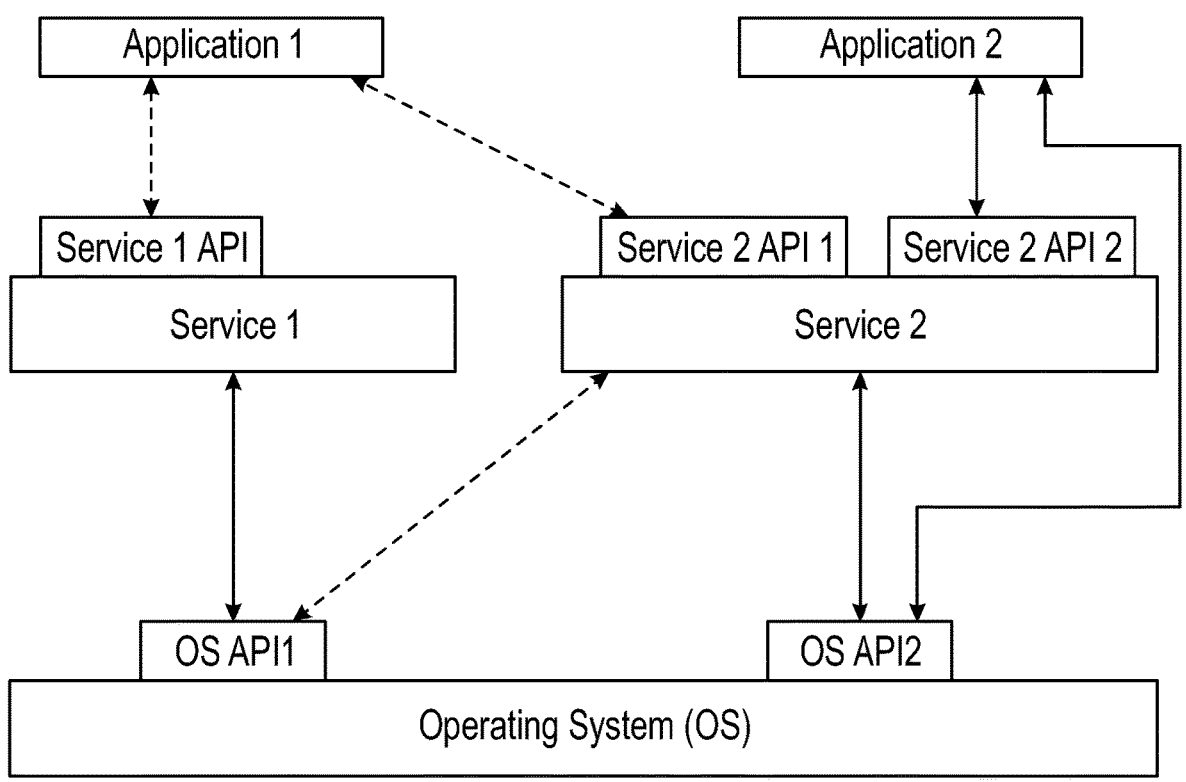
FIG. 11 illustrates an exemplary software stack for making calls using APIs according to some embodiments of the disclosure.

In the example software stack of FIG. 11, applications optionally make calls to Services A or B using several Service APIs and to Operating System (OS) using several OS APIs. Services A and B optionally make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which is optionally, for example, a software library) makes calls to and receives returned values from OS API 1, and Service 2 (which is optionally, for example, a software library) makes calls to and receives returned values from both OS API 1 and OS API 2. Application 2 makes calls to and receives returned values from OS API 2.

Examples of electronic devices, user interfaces for such devices, and associated processes for using such devices that are compatible with some embodiments of the disclosure will now be described. In some embodiments, the device is optionally a media player or is optionally a portable multifunction communications device that optionally also contains other functions, such as PDA and/or music player functions. Exemplary multifunction devices optionally include, without limitation, the iPhone®, iPod Touch®, iPad®, and Apple TV® devices from Apple Inc. of Cupertino, Calif. Other portable electronic devices, such as laptops or tablet computers with touch-sensitive surfaces (e.g., touch screen displays and/or touch pads), are optionally used. It should also be understood that, in some embodiments, the device is optionally not a portable communications device, but rather is a desktop computer or a television with a touch-sensitive surface (e.g., a touch screen display and/or a touch pad). In some embodiments, the device optionally does not have a touch screen display and/or a touch pad, but rather is capable of outputting display information (such as the user interfaces of the disclosure) for display on a separate display device, and is capable of receiving input information from a separate input device having one or more input mechanisms (such as one or more buttons, a touch screen display and/or a touch pad). In some embodiments, the device has a display, and optionally is capable of receiving input information from a separate input device having one or more input mechanisms (such as one or more buttons, a touch screen display and/or a touch pad).

In the discussion that follows, an electronic device that optionally includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed among two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device optionally supports a variety of applications, such as one or more of the following: a digital media player application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a television channel browsing application.

The various applications that are optionally executed on the device optionally use at least one common physical user-interface device, such as the touch-sensitive surface. One or more functions of the touch-sensitive surface as well as corresponding information displayed on the device are optionally adjusted and/or varied from one application to the next and/or within a respective application. In this way, a common physical architecture (such as the touch-sensitive surface) of the device optionally supports the variety of applications with user interfaces that are intuitive and transparent to the user.

Figure 12A:
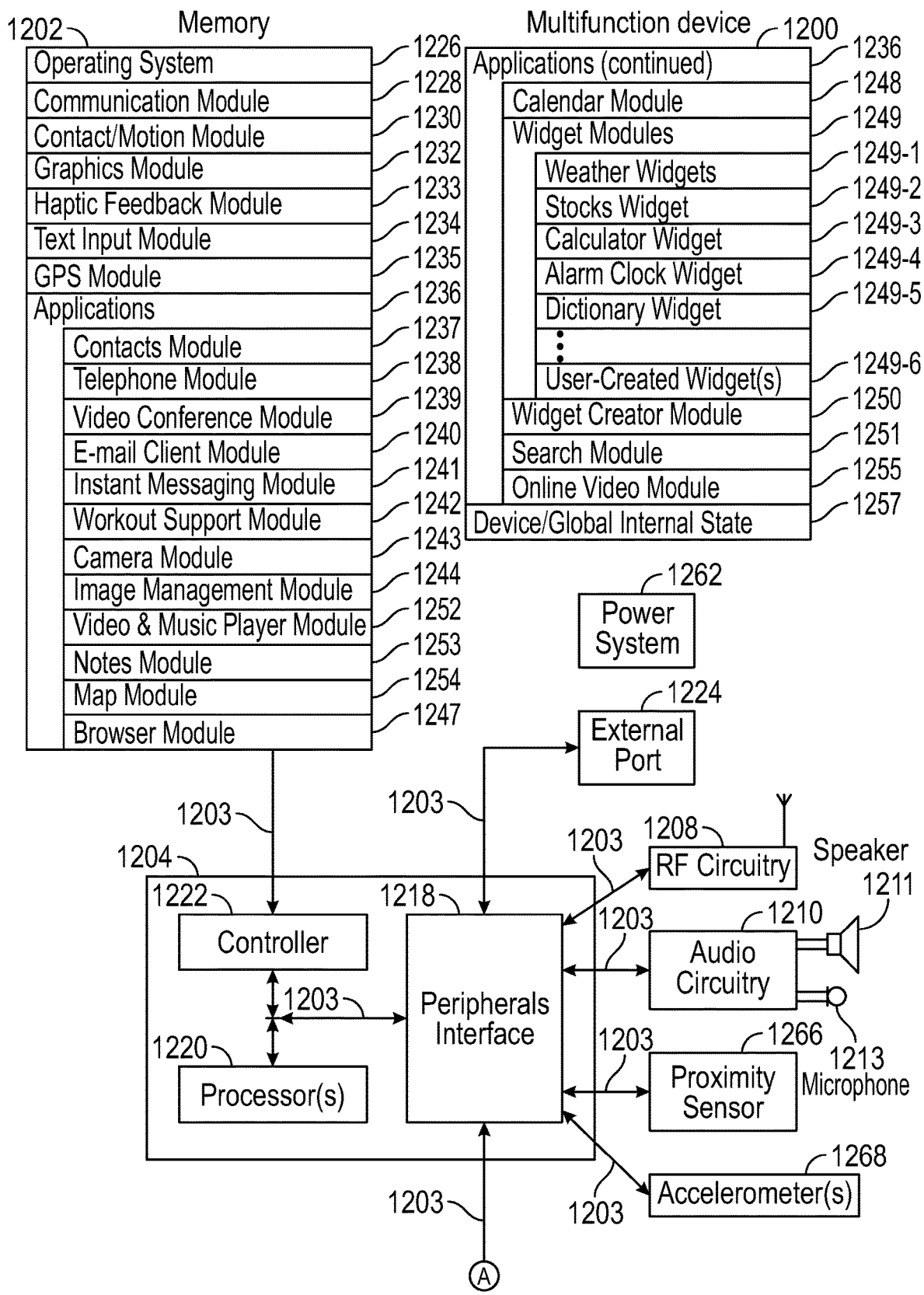
FIG. 12A is a block diagram illustrating an exemplary portable or non-portable multifunction device with touch-sensitive displays in accordance with some embodiments of the disclosure.
Figure 12A:
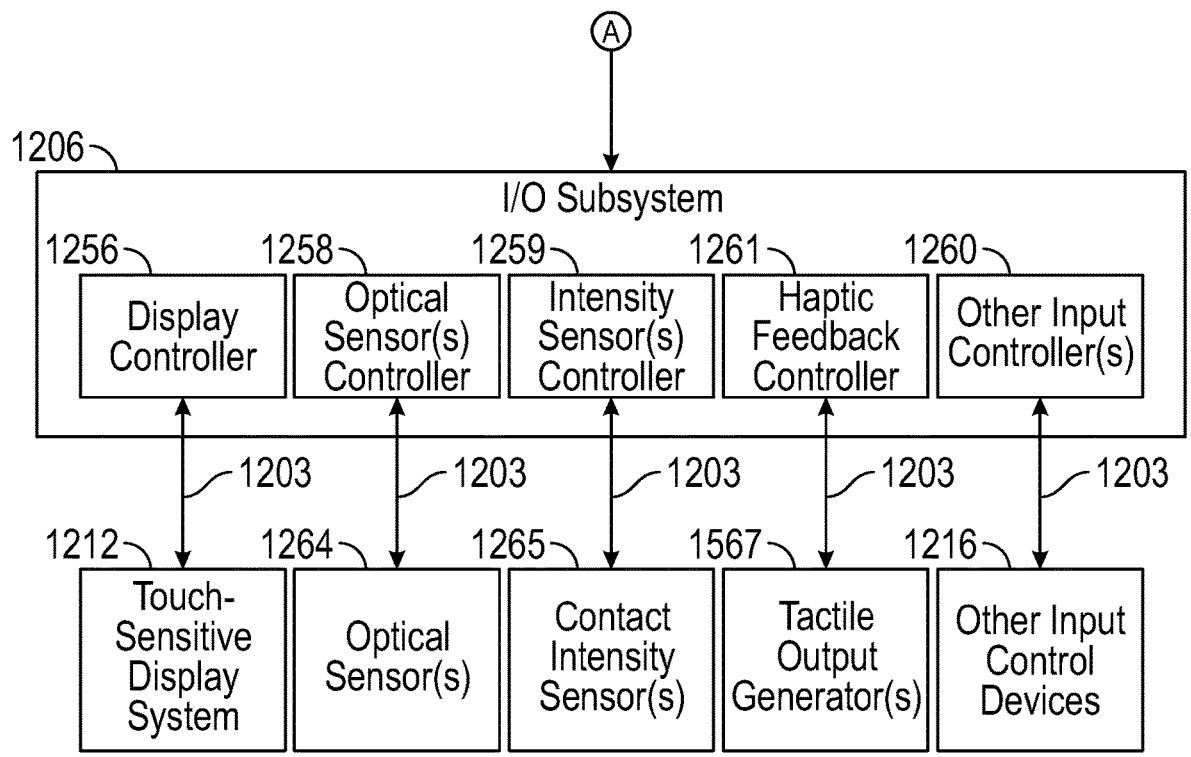

Attention is now directed toward examples of portable or non-portable devices with touch-sensitive displays, though the devices need not include touch-sensitive displays or displays in general. FIG. 12A is a block diagram illustrating an exemplary portable or non-portable multifunction device 1200 with touch-sensitive displays 1212 in accordance with some embodiments of the disclosure. Touch-sensitive display 1212 is sometimes called a "touch screen" for convenience, and is sometimes known as or called a touch-sensitive display system. Device 1200 optionally includes memory 1202 (which optionally includes one or more computer readable storage mediums), memory controller 1222, one or more processing units (CPU's) 1220, peripherals interface 1218, RF circuitry 1208, audio circuitry 1210, speaker 1211, microphone 1213, input/output (I/O) subsystem 1206, other input or control devices 1216, and external port 1224. Device 1200 optionally includes one or more optical sensors 1264. Device 1200 optionally includes one or more intensity sensors 1265 for detecting intensity of contacts on device 1200 (e.g., a touch-sensitive surface such as touch-sensitive display system 1212 of device 1200). Device 1200 optionally includes one or more tactile output generators 1267 for generating tactile outputs on device 1200 (e.g., generating tactile outputs on a touch-sensitive surface such as touch-sensitive display system 1212 of device 1200 or touchpad 1455 of device 1400). These components optionally communicate over one or more communication buses or signal lines 1203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact optionally has a range of values that optionally includes at least four distinct values and more typically includes hundreds of distinct values (e.g., at least 256). Intensity of a contact is optionally determined (or measured) using various approaches and various sensors or combinations of sensors. In some embodiments, one or more force sensors underneath or adjacent to the touch-sensitive surface are optionally used to measure force at various points on the touch-sensitive surface. In some embodiments, force measurements from multiple force sensors are optionally combined (e.g., a weighted average) to determine an estimated force of a contact. Similarly, a pressure-sensitive tip of a stylus is optionally used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are optionally used as a substitute for the force or pressure of the contact on the touch-sensitive surface. In some embodiments, the substitute measurements for contact force or pressure are optionally used directly to determine whether an intensity threshold has been exceeded (e.g., the intensity threshold is described in units corresponding to the substitute measurements). In some embodiments, the substitute measurements for contact force or pressure are optionally converted to an estimated force or pressure and the estimated force or pressure is optionally used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that is optionally detected by a user with the user's sense of touch. In some embodiments of the disclosure, in situations where the device or the component of the device is in contact with a surface of a user that is sensitive to touch (e.g., a finger, palm, or other part of a user's hand), the tactile output generated by the physical displacement is optionally interpreted by the user as a tactile sensation corresponding to a perceived change in physical characteristics of the device or the component of the device. In some embodiments, movement of a touch-sensitive surface (e.g., a touch-sensitive display or trackpad) is optionally interpreted by the user as a "down click" or "up click" of a physical actuator button. In some embodiments, a user optionally feels a tactile sensation such as an "down click" or "up click" even when there is no movement of a physical actuator button associated with the touch-sensitive surface that is physically pressed (e.g., displaced) by the user's movements. In some embodiments, movement of the touch-sensitive surface is optionally interpreted or sensed by the user as "roughness" of the touch-sensitive surface, even when there is no change in smoothness of the touch-sensitive surface. While such interpretations of touch by a user can be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output optionally corresponds to physical displacement of the device or a component thereof that generates the described sensory perception for a typical (or average) user.

It should be appreciated that device 1200 is only one example of a portable or non-portable multifunction device, and that device 1200 optionally has more or fewer components than shown, optionally combines two or more components, or optionally has a different configuration or arrangement of the components. The various components shown in FIG. 12A are optionally implemented in hardware, software, or a combination of both hardware and software, including one or more signal processing and/or application specific integrated circuits. Further, the various components shown in FIG. 12A are optionally implemented across two or more devices; in some embodiments of the disclosure, a display and audio circuitry on a display device, a touch-sensitive surface on an input device, and remaining components on device 1200. In some embodiments, device 1200 optionally communicates with the display device and/or the input device to facilitate operation of the system, as described in the disclosure, and the various components described herein that relate to display and/or input remain in device 1200, or are optionally included in the display and/or input device, as appropriate.

Memory 1202 optionally includes high-speed random access memory and optionally also includes non-volatile memory, such as one or more magnetic disk storage devices, flash memory devices, or other non-volatile solid-state memory devices. Access to memory 1202 by other components of device 1200, such as CPU 1220 and the peripherals interface 1218, is optionally controlled by memory controller 1222.

Peripherals interface 1218 is optionally used to couple input and output peripherals of the device to CPU 1220 and memory 1202. The one or more processors 1220 optionally run or execute various software programs and/or sets of instructions stored in memory 1202 to perform various functions for device 1200 and to process data.

In some embodiments of the disclosure, peripherals interface 1218, CPU 1220, and memory controller 1222 are optionally implemented on a single chip, such as chip 1204. In some embodiments, they are optionally implemented on separate chips.

RF (radio frequency) circuitry 1208 optionally receives and sends RF signals, also called electromagnetic signals. RF circuitry 1208 optionally converts electrical signals to/from electromagnetic signals and communicates with communications networks and other communications devices via the electromagnetic signals. RF circuitry 1208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1210, speaker 1211, and microphone 1213 optionally provides an audio interface between a user and device 1200. Audio circuitry 1210 optionally receives audio data from peripherals interface 1218, converts the audio data to an electrical signal, and transmits the electrical signal to speaker 1211. Speaker 1211 optionally converts the electrical signal to human-audible sound waves. Audio circuitry 1210 optionally also receives electrical signals converted by microphone 1213 from sound waves. Audio circuitry 1210 optionally converts the electrical signal to audio data and transmits the audio data to peripherals interface 1218 for processing. Audio data is, optionally, retrieved from and/or transmitted to memory 1202 and/or RF circuitry 1208 by peripherals interface 1218. In some embodiments of the disclosure, audio circuitry 1210 optionally also includes a headset jack (e.g., 1312, FIG. 13). The headset jack optionally provides an interface between audio circuitry 1210 and removable audio input/output peripherals, such as output-only headphones or a headset with both output (e.g., a headphone for one or both ears) and input (e.g., a microphone).

I/O subsystem 1206 optionally couples input/output peripherals on device 1200, such as touch screen 1212 and other input control devices 1216, to peripherals interface 1218. I/O subsystem 1206 optionally includes display controller 1256, optical sensor controller 1258, intensity sensor controller 1259, haptic feedback controller 1261 and one or more input controllers 1260 for other input or control devices. The one or more input controllers 1260 optionally receive/send electrical signals from/to other input or control devices 1216. The other input control devices 1216 optionally include physical buttons (e.g., push buttons, rocker buttons, etc.), dials, slider switches, joysticks, click wheels, and so forth. In some embodiments of the disclosure, input controller(s) 1260 are, optionally, coupled to any (or none) of the following: a keyboard, infrared port, USB port, and a pointer device such as a mouse. The one or more buttons (e.g., 1308, FIG. 13) optionally include an up/down button for volume control of speaker 1211 and/or microphone 1213. The one or more buttons optionally include a push button (e.g., 1306, FIG. 13).

Touch-sensitive display 1212 optionally provides an input interface and an output interface between the device and a user. As described above, the touch-sensitive operation and the display operation of touch-sensitive display 1212 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 1256 optionally receives and/or sends electrical signals from/to touch screen 1212. Touch screen 1212 optionally displays visual output to the user. The visual output optionally includes graphics, text, icons, video, and any combination thereof (collectively termed "graphics"). In some embodiments of the disclosure, some or all of the visual output corresponds to user-interface objects.

Touch screen 1212 optionally has a touch-sensitive surface, sensor or set of sensors that accepts input from the user based on haptic and/or tactile contact. Touch screen 1212 and display controller 1256 (along with any associated modules and/or sets of instructions in memory 1202) optionally detects contact (and any movement or breaking of the contact) on touch screen 1212 and converts the detected contact into interaction with user-interface objects (e.g., one or more soft keys, icons, web pages or images) that are displayed on touch screen 1212. In some embodiments of the disclosure, a point of contact between touch screen 1212 and the user corresponds to a finger of the user.

Touch screen 1212 optionally uses LCD (liquid crystal display) technology, LPD (light emitting polymer display) technology, or LED (light emitting diode) technology, although other display technologies are used in some embodiments of the disclosure. Touch screen 1212 and display controller 1256 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 1212. In some embodiments, projected mutual capacitance sensing technology is used, such as that found in the iPhone®, iPod Touch®, and iPad® from Apple Inc. of Cupertino, Calif.

Touch screen 1212 optionally has a video resolution in excess of 100 dpi. In some embodiments of the disclosure, the touch screen optionally has a video resolution of approximately 160 dpi. The user optionally makes contact with touch screen 1212 using any suitable object or appendage, such as a stylus, a finger, and so forth. In some embodiments, the user interface is optionally designed to work primarily with finger-based contacts and gestures, which are less precise than stylus-based input due to the larger area of contact of a finger on the touch screen. In some embodiments, the device optionally translates the rough finger-based input into a precise pointer/cursor position or command for performing the actions desired by the user.

In some embodiments of the disclosure, in addition to the touch screen, device 1200 optionally includes a touchpad (not shown) for activating or deactivating particular functions. In some embodiments, the touchpad is optionally a touch-sensitive area of the device that, unlike the touch screen, does not display visual output. The touchpad is, optionally, a touch-sensitive surface that is separate from touch screen 1212 or an extension of the touch-sensitive surface formed by the touch screen.

Device 1200 optionally also includes power system 1262 for powering the various components. Power system 1262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 1200 optionally also includes one or more optical sensors 1264. FIG. 12A shows an example optical sensor coupled to optical sensor controller 1258 in I/O subsystem 1206 in some embodiments of the disclosure. Optical sensor 1264 optionally includes charge-coupled device (CCD) or complementary metal-oxide semiconductor (CMOS) phototransistors. Optical sensor 1264 optionally receives light from the environment, projected through one or more lenses, and converts the light to data representing an image. In conjunction with imaging module 1243 (also called a camera module), optical sensor 1264 optionally captures still images or video. In some embodiments, an optical sensor is optionally located on the back of device 1200, opposite touch screen display 1212 on the front of the device, so that the touch screen display is enabled for use as a viewfinder for still and/or video image acquisition. In some embodiments, another optical sensor is optionally located on the front of the device so that the user's image is, optionally, obtained for videoconferencing while the user views the other video conference participants on the touch screen display.

Device 1200 optionally also includes one or more contact intensity sensors 1265. FIG. 12A shows an example contact intensity sensor coupled to intensity sensor controller 1259 in I/O subsystem 1206 according to some embodiments of the disclosure. Contact intensity sensor 1265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 1265 optionally receives contact intensity information (e.g., pressure information or a proxy for pressure information) from the environment. In some embodiments, at least one contact intensity sensor is optionally collocated with, or proximate to, a touch-sensitive surface (e.g., touch-sensitive display system 1212). In some embodiments, at least one contact intensity sensor is optionally located on the back of device 1200, opposite touch screen display 1212 which is located on the front of device 1200.

Device 1200 optionally also includes one or more proximity sensors 1266. FIG. 12A shows example proximity sensor 1266 coupled to peripherals interface 1218 according to some embodiments of the disclosure. Alternately, proximity sensor 1266 is optionally coupled to input controller 1260 in I/O subsystem 1206. In some embodiments, the proximity sensor optionally turns off and disables touch screen 1212 when the multifunction device is placed near the user's ear (e.g., when the user is making a phone call).

Device 1200 optionally also includes one or more tactile output generators 1267. FIG. 12A shows an example tactile output generator coupled to haptic feedback controller 1261 in I/O subsystem 1206 according to some embodiments of the disclosure. Tactile output generator 1267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 1265 optionally receives tactile feedback generation instructions from haptic feedback module 1233 and generates tactile outputs on device 1200 that are sensed by a user of device 1200. In some embodiments, at least one tactile output generator is optionally collocated with, or proximate to, a touch-sensitive surface (e.g., touch-sensitive display system 1212) and, optionally, generates a tactile output by moving the touch-sensitive surface vertically (e.g., in/out of a surface of device 1200) or laterally (e.g., back and forth in the same plane as a surface of device 1200). In some embodiments, at least one tactile output generator sensor is optionally located on the back of device 1200, opposite touch screen display 1212 which is located on the front of device 1200.

Device 1200 optionally also includes one or more accelerometers 1268. FIG. 12A shows example accelerometer 1268 coupled to peripherals interface 1218 according to some embodiments of the disclosure. Alternately, accelerometer 1268 is, optionally, coupled to an input controller 1260 in I/O subsystem 1206. In some embodiments, information is optionally displayed on the touch screen display in a portrait view or a landscape view based on an analysis of data received from the one or more accelerometers. Device 1200 optionally includes, in addition to accelerometer(s) 1268, a magnetometer (not shown) and a GPS (or GLONASS or other global navigation system) receiver (not shown) for obtaining information concerning the location and orientation (e.g., portrait or landscape) of device 1200.

Figure 14:
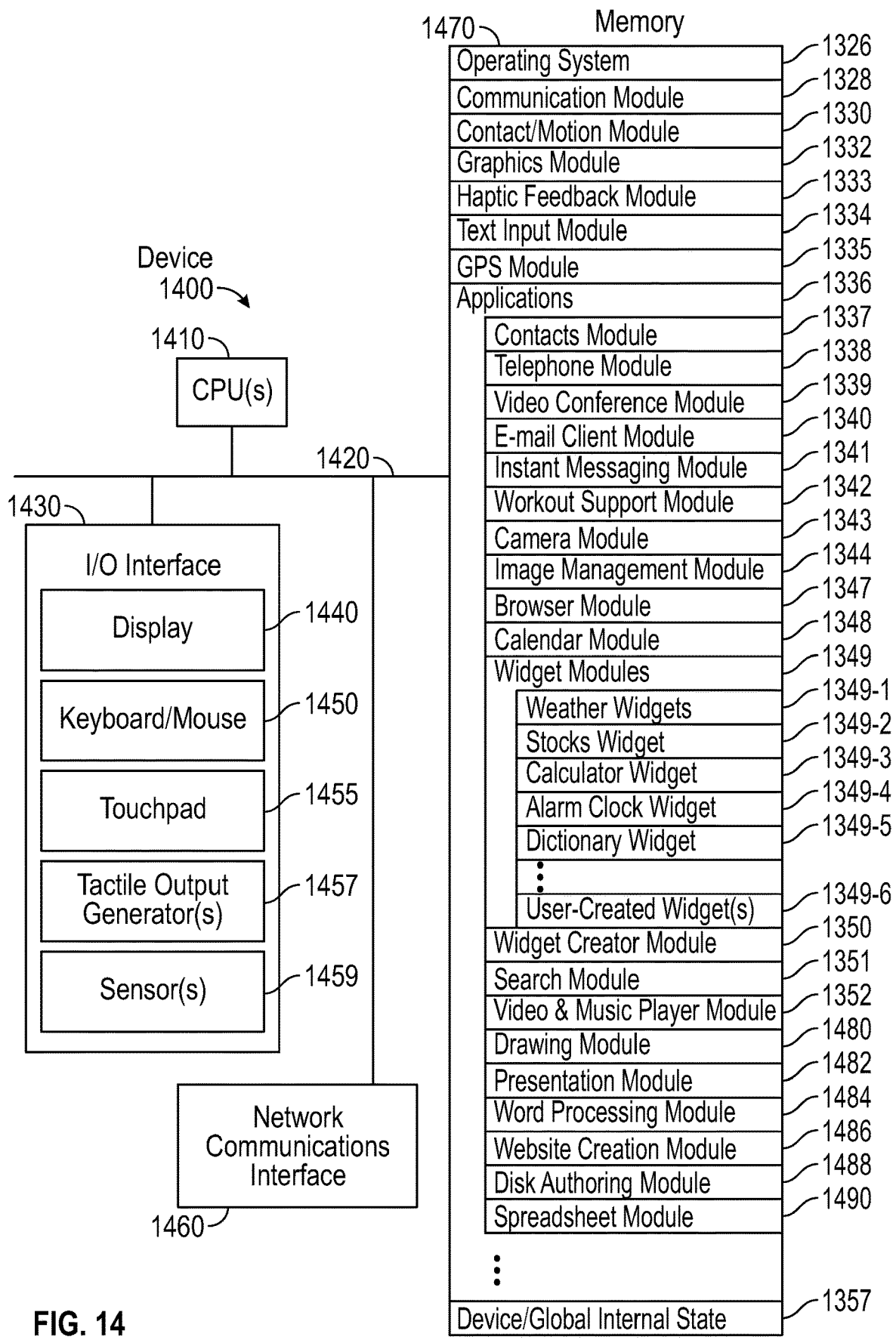
FIG. 14 is a block diagram of an exemplary multifunction device with a display and a touch-sensitive surface in accordance with some embodiments of the disclosure.

In some embodiments of the disclosure, the software components stored in memory 1202 optionally include operating system 1226, communication module (or set of instructions) 1228, contact/motion module (or set of instructions) 1230, graphics module (or set of instructions) 1232, text input module (or set of instructions) 1234, Global Positioning System (GPS) module (or set of instructions) 1235, and applications (or sets of instructions) 1236. Furthermore, in some embodiments, memory 1202 optionally stores device/global internal state 1257, as shown in FIGS. 12A and 14. Device/global internal state 1257 optionally includes one or more of: active application state, indicating which applications, if any, are currently active; display state, indicating what applications, views or other information occupy various regions of touch screen display 1212; sensor state, including information obtained from the device's various sensors and input control devices 1216; and location information concerning the device's location and/or attitude.

Operating system 1226 (e.g., Darwin, RTXC, LINUX, UNIX, OS X, WINDOWS, or an embedded operating system such as VxWorks) optionally includes various software components and/or drivers for controlling and managing general system tasks (e.g., memory management, storage device control, power management, etc.) and facilitates communication between various hardware and software components.

Communication module 1228 optionally facilitates communication with other devices over one or more external ports 1224 and also includes various software components for handling data received by RF circuitry 1208 and/or external port 1224. External port 1224 (e.g., Universal Serial Bus (USB), FIREWIRE, etc.) is optionally adapted for coupling directly to other devices or indirectly over a network (e.g., the Internet, wireless LAN, etc.). In some embodiments of the disclosure, the external port is optionally a multi-pin (e.g., 30-pin) connector that is the same as, or similar to and/or compatible with the 30-pin connector used on iPod (trademark of Apple Inc.) devices.

Contact/motion module 1230 optionally detects contact with touch screen 1212 (in conjunction with display controller 1256) and other touch-sensitive devices (e.g., a touchpad or physical click wheel). Contact/motion module 1230 optionally includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 1230 optionally receives contact data from the touch-sensitive surface. Determining movement of the point of contact, which is optionally represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments of the disclosure, contact/motion module 1230 and display controller 1256 optionally detect contact on a touchpad.

In some embodiments of the disclosure, contact/motion module 1230 optionally uses a set of one or more intensity thresholds to determine whether an operation has been performed by a user (e.g., to determine whether a user has "clicked" on an icon). In some embodiments, at least a subset of the intensity thresholds is optionally determined in accordance with software parameters (e.g., the intensity thresholds are not determined by the activation thresholds of particular physical actuators and are adjusted without changing the physical hardware of device 1200). In some embodiments, a mouse "click" threshold of a trackpad or touch screen display is optionally set to any of a large range of predefined thresholds values without changing the trackpad or touch screen display hardware. Additionally, in some embodiments, a user of the device is optionally provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 1230 optionally detects a gesture input by a user. Different gestures on the touch-sensitive surface optionally have different contact patterns and intensities. Thus, a gesture is, optionally, detected by detecting a particular contact pattern. In some embodiments of the disclosure, detecting a finger tap gesture optionally includes detecting a finger-down event followed by detecting a finger-up (lift off) event at the same position (or substantially the same position) as the finger-down event (e.g., at the position of an icon). In some embodiments, detecting a finger swipe gesture on the touch-sensitive surface optionally includes detecting a finger-down event followed by detecting one or more finger-dragging events, subsequently followed by detecting a finger-up (lift off) event.

Graphics module 1232 optionally includes various known software components for rendering and displaying graphics on touch screen 1212 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments of the disclosure, graphics module 1232 optionally stores data representing graphics to be used. Each graphic is, optionally, assigned a corresponding code. Graphics module 1232 optionally receives, from applications etc., one or more codes specifying graphics to be displayed along with, if necessary, coordinate data and other graphic property data, and then generates screen image data to output to display controller 1256.

Haptic feedback module 1233 optionally includes various software components for generating instructions used by tactile output generator(s) 1267 to produce tactile outputs at one or more locations on device 1200 in response to user interactions with device 1200.

Text input module 1234, which is, optionally, a component of graphics module 1232, optionally provides soft keyboards for entering text in various applications (e.g., contacts 1237, e-mail 1240, IM 1241, browser 1247, and any other application that needs text input).

GPS module 1235 optionally determines the location of the device and provides this information for use in various applications (e.g., to telephone 1238 for use in location-based dialing, to camera 1243 as picture/video metadata, and to applications that provide location-based services such as weather widgets, local yellow page widgets, and map/navigation widgets).

Applications 1236 optionally include the following modules (or sets of instructions), or a subset or superset thereof:
contacts module 1237 (sometimes called an address book or contact list);
telephone module 1238;
video conferencing module 1239;
e-mail client module 1240;
instant messaging (IM) module 1241;
workout support module 1242;
camera module 1243 for still and/or video images;
image management module 1244;
browser module 1247;
calendar module 1248;
widget modules 1249, which optionally include one or more of: weather widget 1249-1, stocks widget 1249-2, calculator widget 1249-3, alarm clock widget 1249-4, dictionary widget 1249-5, and other widgets obtained by the user, as well as user-created widgets 1249-6;
widget creator module 1250 for making user-created widgets 1249-6;
search module 1251;
video and music player module 1252, which is, optionally, made up of a video player module and a music player module;
notes module 1253;
map module 1254;
online video module 1255.

In some embodiments of the disclosure, other applications 1236 that are, optionally, stored in memory 1202 include other word processing applications, other image editing applications, drawing applications, presentation applications, JAVA-enabled applications, encryption, digital rights management, voice recognition, and voice replication.

In conjunction with touch screen 1212, display controller 1256, contact module 1230, graphics module 1232, and text input module 1234, contacts module 1237 is, optionally, used to manage an address book or contact list (e.g., stored in application internal state 1292 of contacts module 1237 in memory 1202 or memory 1470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1238, video conference 1239, e-mail 1240, or IM 1241; and so forth.

In conjunction with RF circuitry 1208, audio circuitry 1210, speaker 1211, microphone 1213, touch screen 1212, display controller 1256, contact module 1230, graphics module 1232, and text input module 1234, telephone module 1238 is optionally used to enter a sequence of characters corresponding to a telephone number, access one or more telephone numbers in address book 1237, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 1208, audio circuitry 1210, speaker 1211, microphone 1213, touch screen 1212, display controller 1256, optical sensor 1264, optical sensor controller 1258, contact module 1230, graphics module 1232, text input module 1234, contact list 1237, and telephone module 1238, videoconferencing module 1239 optionally includes executable instructions to initiate, conduct, and terminate a video conference between a user and one or more other participants in accordance with user instructions.

In conjunction with RF circuitry 1208, touch screen 1212, display controller 1256, contact module 1230, graphics module 1232, and text input module 1234, e-mail client module 1240 optionally includes executable instructions to create, send, receive, and manage e-mail in response to user instructions. In conjunction with image management module 1244, e-mail client module 1240 optionally makes it possible to create and send e-mails with still or video images taken with camera module 1243.

In conjunction with RF circuitry 1208, touch screen 1212, display controller 1256, contact module 1230, graphics module 1232, and text input module 1234, the instant messaging module 1241 optionally includes executable instructions to enter a sequence of characters corresponding to an instant message, to modify previously entered characters, to transmit a respective instant message (in some embodiments of the disclosure, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1208, touch screen 1212, display controller 1256, contact module 1230, graphics module 1232, text input module 1234, GPS module 1235, map module 1254, and music player module 1246, workout support module 1242 optionally includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1212, display controller 1256, optical sensor(s) 1264, optical sensor controller 1258, contact module 1230, graphics module 1232, and image management module 1244, camera module 1243 optionally includes executable instructions to capture still images or video (including a video stream) and store them into memory 1202, modify characteristics of a still image or video, or delete a still image or video from memory 1202.

In conjunction with touch screen 1212, display controller 1256, contact module 1230, graphics module 1232, text input module 1234, and camera module 1243, image management module 1244 optionally includes executable instructions to arrange, modify (e.g., edit), or otherwise manipulate, label, delete, present (e.g., in a digital slide show or album), and store still and/or video images.

In conjunction with RF circuitry 1208, touch screen 1212, display system controller 1256, contact module 1230, graphics module 1232, and text input module 1234, browser module 1247 optionally includes executable instructions to browse the Internet in accordance with user instructions, including searching, linking to, receiving, and displaying web pages or portions thereof, as well as attachments and other files linked to web pages.

In conjunction with RF circuitry 1208, touch screen 1212, display system controller 1256, contact module 1230, graphics module 1232, text input module 1234, e-mail client module 1240, and browser module 1247, calendar module 1248 optionally includes executable instructions to create, display, modify, and store calendars and data associated with calendars (e.g., calendar entries, to do lists, etc.) in accordance with user instructions.

In conjunction with RF circuitry 1208, touch screen 1212, display system controller 1256, contact module 1230, graphics module 1232, text input module 1234, and browser module 1247, widget modules 1249 are mini-applications that are, optionally, downloaded and used by a user (e.g., weather widget 1249-1, stocks widget 1249-2, calculator widget 1249-3, alarm clock widget 1249-4, and dictionary widget 1249-5) or created by the user (e.g., user-created widget 1249-6). In some embodiments of the disclosure, a widget optionally includes an HTML (Hypertext Markup Language) file, a CSS (Cascading Style Sheets) file, and a JavaScript file. In some embodiments, a widget optionally includes an XML (Extensible Markup Language) file and a JavaScript file (e.g., Yahoo! Widgets).

In conjunction with RF circuitry 1208, touch screen 1212, display system controller 1256, contact module 1230, graphics module 1232, text input module 1234, and browser module 1247, the widget creator module 1250 is, optionally, used by a user to create widgets (e.g., turning a user-specified portion of a web page into a widget).

In conjunction with touch screen 1212, display system controller 1256, contact module 1230, graphics module 1232, and text input module 1234, search module 1251 optionally includes executable instructions to search for text, music, sound, image, video, and/or other files in memory 1202 that match one or more search criteria (e.g., one or more user-specified search terms) in accordance with user instructions.

In conjunction with touch screen 1212, display system controller 1256, contact module 1230, graphics module 1232, audio circuitry 1210, speaker 1211, RF circuitry 1208, and browser module 1247, video and music player module 1252 optionally includes executable instructions that optionally allow the user to download and play back recorded music and other sound files stored in one or more file formats, such as MP3 or AAC files, and executable instructions to display, present or otherwise play back videos (e.g., on touch screen 1212 or on an external, connected display via external port 1224). In some embodiments of the disclosure, device 1200 optionally includes the functionality of an MP3 player, such as an iPod (trademark of Apple Inc.).

In conjunction with touch screen 1212, display controller 1256, contact module 1230, graphics module 1232, and text input module 1234, notes module 1253 optionally includes executable instructions to create and manage notes, to do lists, and the like in accordance with user instructions.

In conjunction with RF circuitry 1208, touch screen 1212, display system controller 1256, contact module 1230, graphics module 1232, text input module 1234, GPS module 1235, and browser module 1247, map module 1254 is, optionally, used to receive, display, modify, and store maps and data associated with maps (e.g., driving directions; data on stores and other points of interest at or near a particular location; and other location-based data) in accordance with user instructions.

In conjunction with touch screen 1212, display system controller 1256, contact module 1230, graphics module 1232, audio circuitry 1210, speaker 1211, RF circuitry 1208, text input module 1234, e-mail client module 1240, and browser module 1247, online video module 1255 optionally includes instructions that allow the user to access, browse, receive (e.g., by streaming and/or download), play back (e.g., on the touch screen or on an external, connected display via external port 1224), send an e-mail with a link to a particular online video, and otherwise manage online videos in one or more file formats, such as H.264. In some embodiments of the disclosure, instant messaging module 1241, rather than e-mail client module 1240, is optionally used to send a link to a particular online video.

Each of the above identified modules and applications optionally correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in some embodiments of the disclosure. In some embodiments, memory 1202 optionally stores a subset of the modules and data structures identified above. Furthermore, memory 1202 optionally stores additional modules and data structures not described above.

In some embodiments of the disclosure, device 1200 is a device where operation of a predefined set of functions on the device is optionally performed exclusively through a touch screen and/or a touchpad (whether included in device 1200 or on a separate device, such as an input device). By using a touch screen and/or a touchpad as the primary input control device for operation of device 1200, the number of physical input control devices (such as push buttons, dials, and the like) on device 1200 is, optionally, reduced.

The predefined set of functions that can be performed exclusively through a touch screen and/or a touchpad optionally include navigation between user interfaces. In some embodiments of the disclosure, the touchpad, when touched by the user, optionally navigates device 1200 to a main, home, or root menu from any user interface that is displayed on device 1200. In some embodiments, a "menu button" is optionally implemented using a touchpad. In some embodiments, the menu button is optionally a physical push button or other physical input control device instead of a touchpad.

Figure 12B:
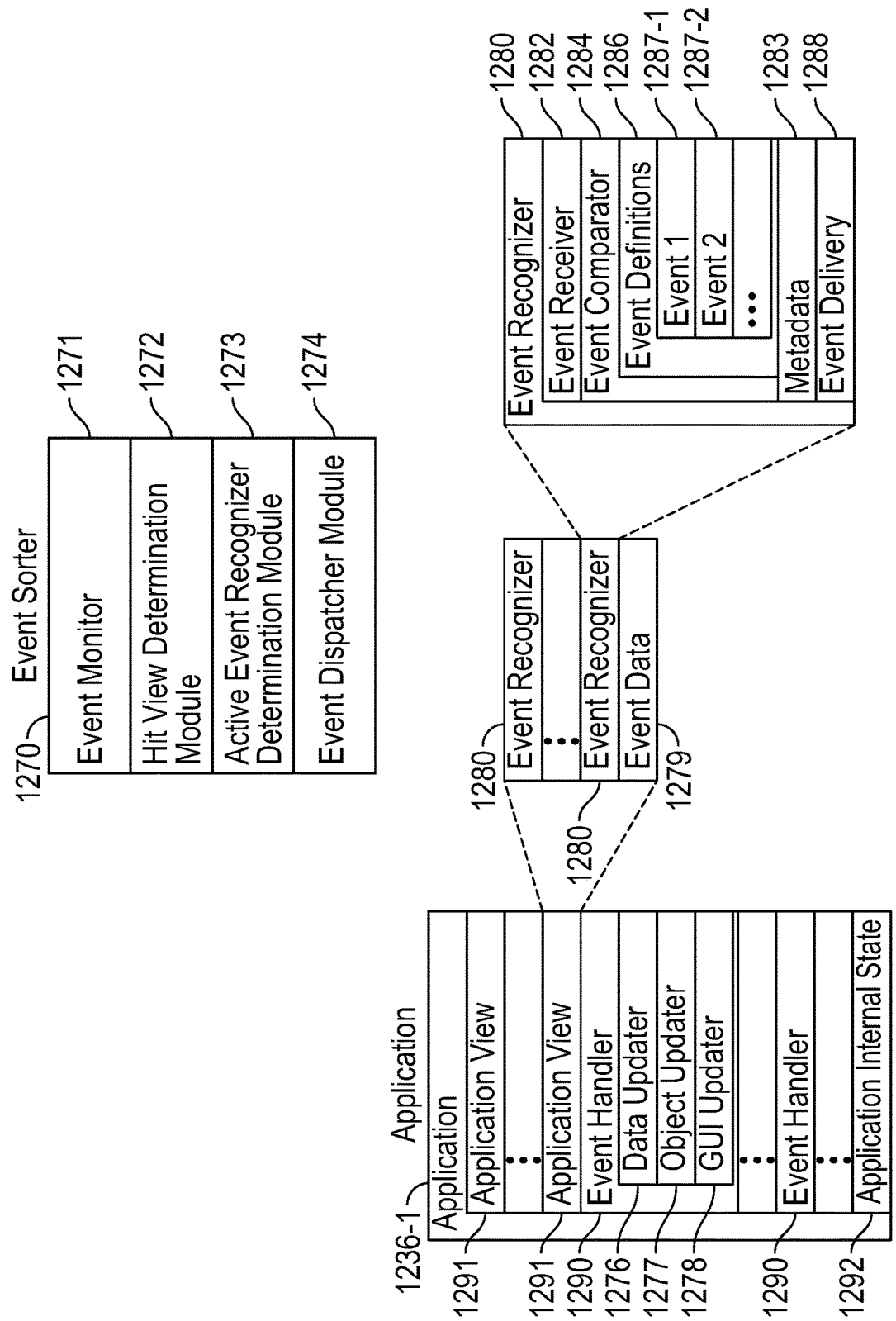
FIG. 12B is a block diagram illustrating exemplary components for event handling in accordance with some embodiments of the disclosure.

FIG. 12B is a block diagram illustrating exemplary components for event handling in accordance with some embodiments of the disclosure. In some embodiments, memory 1202 (in FIG. 12A) or 1470 (FIG. 14) optionally includes event sorter 1270 (e.g., in operating system 1226) and a respective application 1236-1 (e.g., any of the aforementioned applications 1237-151, 1255, 1480-1490).

Event sorter 1270 optionally receives event information and determines the application 1236-1 and application view 1291 of application 1236-1 to which to deliver the event information. Event sorter 1270 optionally includes event monitor 1271 and event dispatcher module 1274. In some embodiments of the disclosure, application 1236-1 optionally includes application internal state 1292, which indicates the current application view(s) displayed on touch-sensitive display 1212 when the application is active or executing. In some embodiments, device/global internal state 1257 is optionally used by event sorter 1270 to determine which application(s) is (are) currently active, and application internal state 1292 is used by event sorter 1270 to determine application views 1291 to which to deliver event information.

In some embodiments of the disclosure, application internal state 1292 optionally includes additional information, such as one or more of: resume information to be used when application 1236-1 resumes execution, user interface state information that indicates information being displayed or that is ready for display by application 1236-1, a state queue for enabling the user to go back to a prior state or view of application 1236-1, and a redo/undo queue of previous actions taken by the user.

Event monitor 1271 optionally receives event information from peripherals interface 1218. Event information optionally includes information about a sub-event (e.g., a user touch on touch-sensitive display 1212, as part of a multi-touch gesture). Peripherals interface 1218 optionally transmits information it receives from I/O subsystem 1206 or a sensor, such as proximity sensor 1266, accelerometer(s) 1268, and/or microphone 1213 (through audio circuitry 1210). Information that peripherals interface 1218 receives from I/O subsystem 1206 optionally includes information from touch-sensitive display 1212 or a touch-sensitive surface.

In some embodiments of the disclosure, event monitor 1271 optionally sends requests to the peripherals interface 1218 at predetermined intervals. In response, peripherals interface 1218 optionally transmits event information. In some embodiments, peripheral interface 1218 optionally transmits event information only when there is a significant event (e.g., receiving an input above a predetermined noise threshold and/or for more than a predetermined duration).

In some embodiments of the disclosure, event sorter 1270 optionally also includes a hit view determination module 1272 and/or an active event recognizer determination module 1273.

Hit view determination module 1272 optionally provides software procedures for determining where a sub-event has taken place within one or more views, when touch-sensitive display 1212 displays more than one view. Views are optionally made up of controls and other elements that a user can see on the display.

Another aspect of the user interface that is optionally associated with an application is a set of views, sometimes herein called application views or user interface windows, in which information is optionally displayed and touch-based gestures optionally occur. The application views (of a respective application) in which a touch is detected optionally correspond to programmatic levels within a programmatic or view hierarchy of the application. In some embodiments of the disclosure, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 1272 optionally receives information related to sub-events of a touch-based gesture. When an application has multiple views organized in a hierarchy, hit view determination module 1272 optionally identifies a hit view as the lowest view in the hierarchy which should handle the sub-event. In most circumstances, the hit view is optionally the lowest level view in which an initiating sub-event can occur (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 1273 optionally determines which view or views within a view hierarchy should receive a particular sequence of sub-events. In some embodiments of the disclosure, active event recognizer determination module 1273 optionally determines that only the hit view should receive a particular sequence of sub-events. In some embodiments, active event recognizer determination module 1273 optionally determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 1274 optionally dispatches the event information to an event recognizer (e.g., event recognizer 1280). In some embodiments of the disclosure, including active event recognizer determination module 1273, event dispatcher module 1274 optionally delivers the event information to an event recognizer determined by active event recognizer determination module 1273. In some embodiments, event dispatcher module 1274 optionally stores in an event queue the event information, which is optionally retrieved by a respective event receiver module 1282.

In some embodiments of the disclosure, operating system 1226 optionally includes event sorter 1270. Alternatively, application 1236-1 optionally includes event sorter 1270. In some embodiments, event sorter 1270 is optionally a stand-alone module, or a part of another module stored in memory 1202, such as contact/motion module 1230.

In some embodiments of the disclosure, application 1236-1 optionally includes a plurality of event handlers 1290 and one or more application views 1291, each of which includes instructions for handling touch events that occur within a respective view of the application's user interface. Each application view 1291 of the application 1236-1 optionally includes one or more event recognizers 1280. Typically, a respective application view 1291 optionally includes a plurality of event recognizers 1280. In some embodiments, one or more of event recognizers 1280 are optionally a part of a separate module, such as a user interface kit (not shown) or a higher level object from which application 1236-1 inherits methods and other properties. In some embodiments, a respective event handler 1290 optionally includes one or more of: data updater 1276, object updater 1277, GUI updater 1278, and/or event data 1279 received from event sorter 1270. Event handler 1290 optionally utilizes or calls data updater 1276, object updater 1277 or GUI updater 1278 to update the application internal state 1292. Alternatively, one or more of the application views 1291 optionally includes one or more respective event handlers 1290. Also, in some embodiments, one or more of data updater 1276, object updater 1277, and GUI updater 1278 are optionally included in a respective application view 1291.

A respective event recognizer 1280 optionally receives event information (e.g., event data 1279) from event sorter 1270, and identifies an event from the event information. Event recognizer 1280 optionally includes event receiver 1282 and event comparator 1284. In some embodiments of the disclosure, event recognizer 1280 also optionally includes at least a subset of: metadata 1283, and event delivery instructions 1288 (which optionally include sub-event delivery instructions).

Event receiver 1282 optionally receives event information from event sorter 1270. The event information optionally includes information about a sub-event, for example, in some embodiments of the disclosure, a touch or a touch movement. Depending on the sub-event, the event information also optionally includes additional information, such as location of the sub-event. When the sub-event concerns motion of a touch, the event information optionally also includes speed and direction of the sub-event. In some embodiments, events optionally include rotation of the device from one orientation to another (e.g., from a portrait orientation to a landscape orientation, or vice versa), and the event information includes corresponding information about the current orientation (also called device attitude) of the device.

Event comparator 1284 optionally compares the event information to predefined event or sub-event definitions and, based on the comparison, determines an event or sub-event, or determines or updates the state of an event or sub-event. In some embodiments of the disclosure, event comparator 1284 optionally includes event definitions 1286. Event definitions 1286 optionally contain definitions of events (e.g., predefined sequences of sub-events), for example, event 1 (1587-1), event 2 (1587-2), and others. In some embodiments, sub-events in an event 1287 optionally include, for example, touch begin, touch end, touch movement, touch cancellation, and multiple touching. In some embodiments, the definition for event 1 (1587-1) is optionally a double tap on a displayed object. The double tap, in some embodiments, optionally comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In some embodiments, the definition for event 2 (1587-2) is optionally a dragging on a displayed object. The dragging, in some embodiments, optionally comprises a touch (or contact) on the displayed object for a predetermined phase, a movement of the touch across touch-sensitive display 1212, and lift-off of the touch (touch end). In some embodiments, the event optionally also includes information for one or more associated event handlers 1290.

In some embodiments of the disclosure, event definition 1287 optionally includes a definition of an event for a respective user-interface object. In some embodiments, event comparator 1284 optionally performs a hit test to determine which user-interface object is associated with a sub-event. In some embodiments, in an application view in which three user-interface objects are displayed on touch-sensitive display 1212, when a touch is detected on touch-sensitive display 1212, event comparator 1284 optionally performs a hit test to determine which of the three user-interface objects is associated with the touch (sub-event). If each displayed object is associated with a respective event handler 1290, the event comparator optionally uses the result of the hit test to determine which event handler 1290 should be activated. In some embodiments, event comparator 1284 selects an event handler associated with the sub-event and the object triggering the hit test.

In some embodiments of the disclosure, the definition for a respective event 1287 optionally also includes delayed actions that delay delivery of the event information until after it has been determined whether the sequence of sub-events does or does not correspond to the event recognizer's event type.

When a respective event recognizer 1280 determines that the series of sub-events do not match any of the events in event definitions 1286, the respective event recognizer 1280 optionally enters an event impossible, event failed, or event ended state, after which it disregards subsequent sub-events of the touch-based gesture. In this situation, other event recognizers, if any, that remain active for the hit view optionally continue to track and process sub-events of an ongoing touch-based gesture.

In some embodiments of the disclosure, a respective event recognizer 1280 optionally includes metadata 1283 with configurable properties, flags, and/or lists that indicate how the event delivery system should perform sub-event delivery to actively involved event recognizers. In some embodiments, metadata 1283 optionally includes configurable properties, flags, and/or lists that indicate how event recognizers interact, or are enabled to interact, with one another. In some embodiments, metadata 1283 optionally includes configurable properties, flags, and/or lists that indicate whether sub-events are delivered to varying levels in the view or programmatic hierarchy.

In some embodiments of the disclosure, a respective event recognizer 1280 optionally activates event handler 1290 associated with an event when one or more particular sub-events of an event are recognized. In some embodiments, a respective event recognizer 1280 optionally delivers event information associated with the event to event handler 1290. Activating an event handler 1290 is distinct from sending (and deferred sending) sub-events to a respective hit view. In some embodiments, event recognizer 1280 optionally throws a flag associated with the recognized event, and event handler 1290 associated with the flag optionally catches the flag and performs a predefined process.

In some embodiments of the disclosure, event delivery instructions 1288 optionally include sub-event delivery instructions that deliver event information about a sub-event without activating an event handler. Instead, the sub-event delivery instructions optionally deliver event information to event handlers associated with the series of sub-events or to actively involved views. Event handlers associated with the series of sub-events or with actively involved views receive the event information and perform a predetermined process.

In some embodiments of the disclosure, data updater 1276 optionally creates and updates data used in application 1236-1. In some embodiments, data updater 1276 optionally updates the telephone number used in contacts module 1237, or stores a video file used in video player module 1245. In some embodiments, object updater 1277 optionally creates and updates objects used in application 1236-1. In some embodiments, object updater 1277 optionally creates a new user-interface object or updates the position of a user-interface object. GUI updater 1278 updates the GUI. In some embodiments, GUI updater 1278 optionally prepares display information and sends it to graphics module 1232 for display on a touch-sensitive display.

In some embodiments of the disclosure, event handler(s) 1290 optionally includes or has access to data updater 1276, object updater 1277, and GUI updater 1278. In some embodiments, data updater 1276, object updater 1277, and GUI updater 1278 are optionally included in a single module of a respective application 1236-1 or application view 1291. In some embodiments, they are optionally included in two or more software modules.

It shall be understood that the foregoing discussion regarding event handling of user touches on touch-sensitive displays and/or touchpads optionally also apply to other forms of user inputs to operate multifunction devices 1200 with input-devices, not all of which are initiated on touch screens. In some embodiments of the disclosure, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 13:
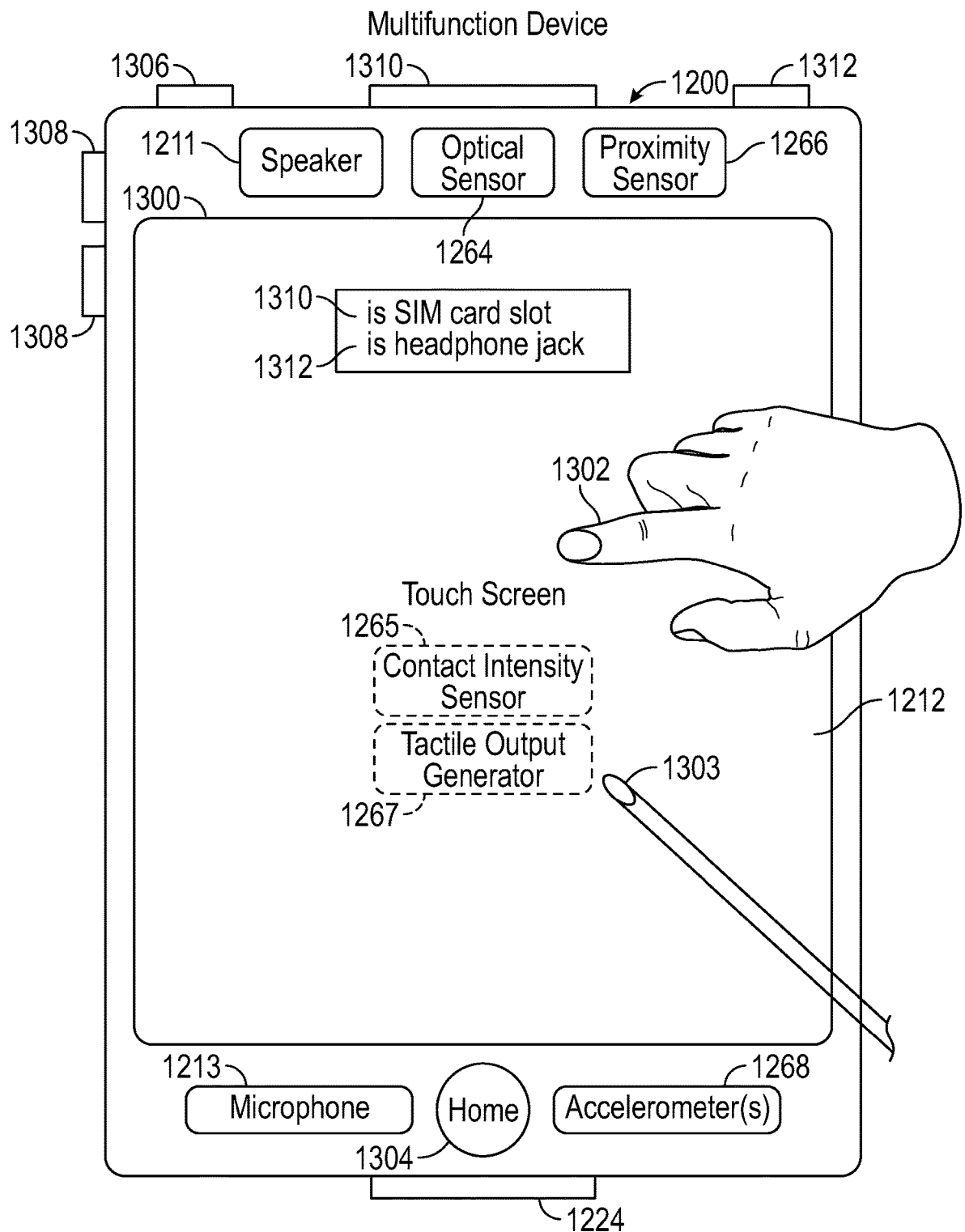
FIG. 13 illustrates an example portable or non-portable multifunction device having a touch screen in accordance with some embodiments of the disclosure.

FIG. 13 illustrates an example portable or non-portable multifunction device 1200 having a touch screen 1212 in accordance with some embodiments of the disclosure. As stated above, multifunction device 1200 optionally includes the various illustrated structures (such as touch screen 1212, speaker 1211, accelerometer 1268, microphone 1213, etc.); however, it is understood that these structures optionally reside on separate devices. In some embodiments, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 1200.

The touch screen 1212 optionally displays one or more graphics within a user interface (UI). In some embodiments of the disclosure, as well as others described below, a user can be enabled to select one or more of the graphics by making a gesture on the graphics, in some embodiments with one or more fingers 1302 (not drawn to scale in the figure) or one or more styluses 1303 (not drawn to scale in the figure). In some embodiments, selection of one or more graphics optionally occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 1200. In some embodiments, inadvertent contact with a graphic does not select the graphic. In some embodiments, a swipe gesture that sweeps over an application icon optionally does not select the corresponding application when the gesture corresponding to selection is a tap.

Device 1200 optionally also includes one or more physical buttons, such as "home" or menu button 1304. As described previously, menu button 1304 is optionally used to navigate to any application 1236 in a set of applications that are optionally executed on device 1200. Alternatively, in some embodiments of the disclosure, the menu button is optionally implemented as a soft key in a GUI displayed on touch screen 1212.

In some embodiments of the disclosure, device 1200 optionally includes touch screen 1212, menu button 1304, push button 1306 for powering the device on/off and locking the device, volume adjustment button(s) 1308, Subscriber Identity Module (SIM) card slot 1310, head set jack 1312, and docking/charging external port 1224. Push button 1306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 1200 optionally also accepts verbal input for activation or deactivation of some functions through microphone 1213. Device 1200 also, optionally, includes one or more contact intensity sensors 1265 for detecting intensity of contacts on touch screen 1212 and/or one or more tactile output generators 1267 for generating tactile outputs for a user of device 1200.

FIG. 14 is a block diagram of an exemplary multifunction device with a display and a touch-sensitive surface in accordance with some embodiments of the disclosure. Device 1400 need not include the display and the touch-sensitive surface, as described above, but rather, in some embodiments, optionally communicates with the display and the touch-sensitive surface on other devices. Additionally, device 1400 need not be portable. In some embodiments, device 1400 is optionally a laptop computer, a desktop computer, a tablet computer, a multimedia player device (such as a television or a set-top box), a navigation device, an educational device (such as a child's learning toy), a gaming system, or a control device (e.g., a home or industrial controller). Device 1400 optionally includes one or more processing units (CPU's) 1410, one or more network or other communications interfaces 1460, memory 1470, and one or more communication buses 1420 for interconnecting these components. Communication buses 1420 optionally include circuitry (sometimes called a chipset) that interconnects and controls communications between system components. Device 1400 optionally includes input/output (I/O) interface 1430 comprising display 1440, which is typically a touch screen display. I/O interface 1430 also optionally includes a keyboard and/or mouse (or other pointing device) 1450 and touchpad 1455, tactile output generator 1457 for generating tactile outputs on device 1400 (e.g., similar to tactile output generator(s) 1267 described above with reference to FIG. 12A), sensors 1459 (e.g., optical, acceleration, proximity, touch-sensitive, and/or contact intensity sensors similar to contact intensity sensor(s) 1265 described above with reference to FIG. 12A). Memory 1470 optionally includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 1470 optionally includes one or more storage devices remotely located from CPU(s) 1410. In some embodiments, memory 1470 optionally stores programs, modules, and data structures analogous to the programs, modules, and data structures stored in memory 1202 of portable or non-portable multifunction device 1200 (FIG. 12A), or a subset thereof. Furthermore, memory 1470 optionally stores additional programs, modules, and data structures not present in memory 1202 of portable or non-portable multifunction device 1200. In some embodiments, memory 1470 of device 1400 optionally stores drawing module 1480, presentation module 1482, word processing module 1484, website creation module 1486, disk authoring module 1488, and/or spreadsheet module 1490, while memory 1202 of portable or non-portable multifunction device 1200 (FIG. 12A) optionally does not store these modules.

Each of the above identified elements in FIG. 14 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in some embodiments of the disclosure. In some embodiments, memory 1470 optionally stores a subset of the modules and data structures identified above. Furthermore, memory 1470 optionally stores additional modules and data structures not described above.

Figure 15:
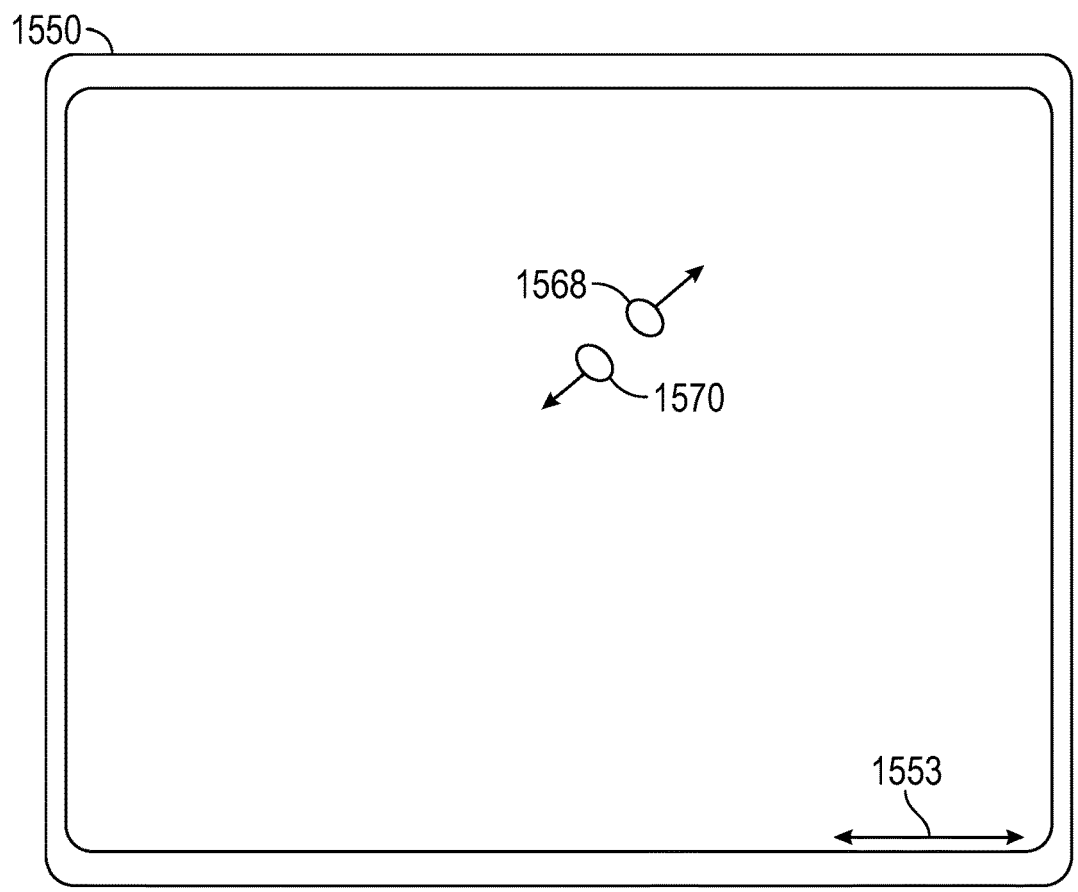
FIG. 15 illustrates an exemplary user interface on a device with a touch-sensitive surface that is separate from the display according to some embodiments of the disclosure.
Figure 15:
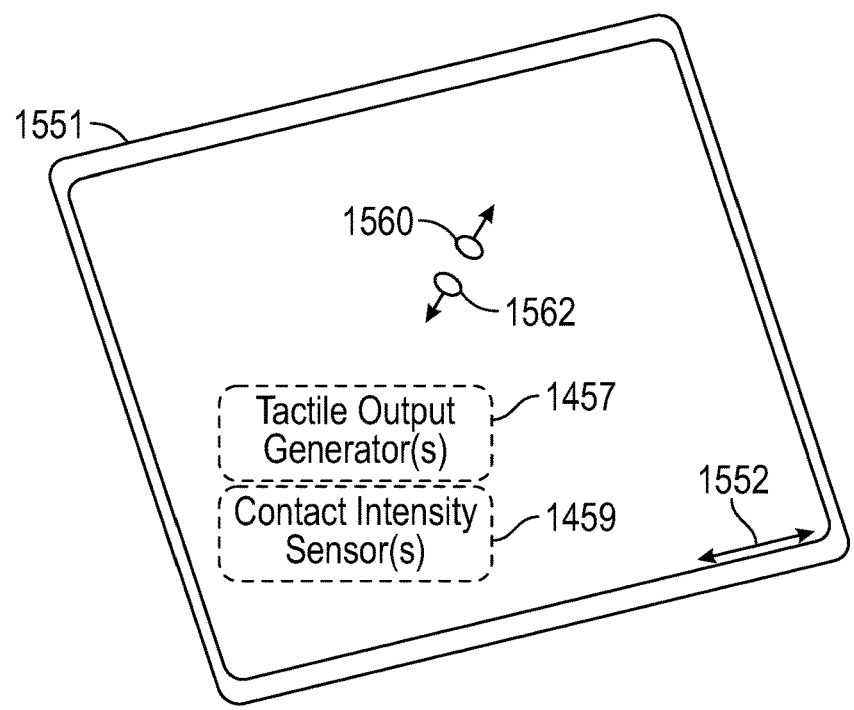

FIG. 15 illustrates an exemplary user interface on a device (e.g., device 1400, FIG. 14) with a touch-sensitive surface 1551 (e.g., a tablet or touchpad 1455, FIG. 14) that is separate from the display 1550 (e.g., touch screen display 1212) according to some embodiments of the disclosure. Device 1400 also, optionally, includes one or more contact intensity sensors (e.g., one or more of sensors 1457) for detecting intensity of contacts on touch-sensitive surface 1551 and/or one or more tactile output generators 1459 for generating tactile outputs for a user of device 1400.

Although some embodiments of the disclosure which follow will be given with reference to inputs on touch screen display 1212 (where the touch sensitive surface and the display are combined), in some embodiments, the device optionally detects inputs on a touch-sensitive surface that is separate from the display, as shown in FIG. 15. In some embodiments, the touch sensitive surface (e.g., 1551 in FIG. 15) optionally has a primary axis (e.g., 1552 in FIG. 15) that corresponds to a primary axis (e.g., 1553 in FIG. 15) on the display (e.g., 1550). In accordance with some embodiments, the device optionally detects contacts (e.g., 1560 and 1562 in FIG. 15) with the touch-sensitive surface 1551 at locations that correspond to respective locations on the display (e.g., in FIG. 15, 1560 corresponds to 1568 and 1562 corresponds to 1570). In this way, user inputs (e.g., contacts 1560 and 1562, and movements thereof) detected by the device on the touch-sensitive surface (e.g., 1551 in FIG. 15) are optionally used by the device to manipulate the user interface on the display (e.g., 1550 in FIG. 15) of the multifunction device when the touch-sensitive surface is separate from the display. It should be understood that similar methods are, optionally, used for other user interfaces described herein.

Additionally, while some embodiments of the disclosure are given primarily with reference to finger inputs (e.g., finger contacts, finger tap gestures, finger swipe gestures), it should be understood that, in some embodiments, one or more of the finger inputs are optionally replaced with input from another input device (e.g., a mouse based input or stylus input). In some embodiments, a swipe gesture is, optionally, replaced with a mouse click (e.g., instead of a contact) followed by movement of the cursor along the path of the swipe (e.g., instead of movement of the contact). In some embodiments, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some embodiments of the disclosure that include a cursor or other location marker, the cursor optionally acts as a "focus selector," so that when an input (e.g., a press input) is detected on a touch-sensitive surface (e.g., touchpad 1455 in FIG. 14 or touch-sensitive surface 1551 in FIG. 15) while the cursor is over a particular user interface element (e.g., a button, window, slider or other user interface element), the particular user interface element is optionally adjusted in accordance with the detected input. In some embodiments that include a touch-screen display (e.g., touch-sensitive display system 1212 in FIG. 12A or touch screen 1212 in FIG. 13) that enables direct interaction with user interface elements on the touch-screen display, a detected contact on the touch-screen optionally acts as a "focus selector," so that when an input (e.g., a press input by the contact) is detected on the touch-screen display at a location of a particular user interface element (e.g., a button, window, slider or other user interface element), the particular user interface element is optionally adjusted in accordance with the detected input. In some embodiments, focus is optionally moved from one region of a user interface to another region of the user interface without corresponding movement of a cursor or movement of a contact on a touch-screen display (e.g., by using a tab key or arrow keys to move focus from one button to another button); in some embodiments, the focus selector optionally moves in accordance with movement of focus between different regions of the user interface. Without regard to the specific form taken by the focus selector, the focus selector is optionally the user interface element (or contact on a touch-screen display) that is controlled by the user so as to communicate the user's intended interaction with the user interface (e.g., by indicating, to the device, the element of the user interface with which the user is intending to interact). In some embodiments, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold IT0, a light press intensity threshold ITL, a deep press intensity threshold ITD, and/or one or more other intensity thresholds). This intensity diagram is typically not part of the displayed user interface, but is provided to aid in the interpretation of the figures. In some embodiments of the disclosure, the light press intensity threshold optionally corresponds to an intensity at which the device will perform operations typically associated with clicking a button of a physical mouse or a trackpad. In some embodiments, the deep press intensity threshold optionally corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold IT0 below which the contact is no longer detected), the device optionally moves a focus selector in accordance with movement of the contact on the touch-sensitive surface without performing an operation associated with the light press intensity threshold or the deep press intensity threshold. Generally, unless otherwise stated, these intensity thresholds are optionally consistent between different sets of user interface figures.

An increase of intensity of the contact from an intensity below the light press intensity threshold ITL to an intensity between the light press intensity threshold ITL and the deep press intensity threshold ITD is sometimes referred to as a "light press" input. An increase of intensity of the contact from an intensity below the deep press intensity threshold ITD to an intensity above the deep press intensity threshold ITD is sometimes referred to as a "deep press" input. An increase of intensity of the contact from an intensity below the contact-detection intensity threshold IT0 to an intensity between the contact-detection intensity threshold IT0 and the light press intensity threshold ITL is sometimes referred to as detecting the contact on the touch-surface. A decrease of intensity of the contact from an intensity above the contact-detection intensity threshold IT0 to an intensity below the contact intensity threshold IT0 is sometimes referred to as detecting liftoff of the contact from the touch-surface. In some embodiments of the disclosure, IT0 is zero. In some embodiments, IT0 is greater than zero. In some embodiments a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments of the disclosure described herein, one or more operations are optionally performed in response to detecting a gesture that includes a respective press input or in response to detecting the respective press input performed with a respective contact (or a plurality of contacts), where the respective press input is optionally detected based at least in part on detecting an increase in intensity of the contact (or plurality of contacts) above a press-input intensity threshold. In some embodiments, the respective operation is optionally performed in response to detecting the increase in intensity of the respective contact above the press-input intensity threshold (e.g., a "down stroke" of the respective press input). In some embodiments, the press input optionally includes an increase in intensity of the respective contact above the press-input intensity threshold and a subsequent decrease in intensity of the contact below the press-input intensity threshold, and the respective operation is optionally performed in response to detecting the subsequent decrease in intensity of the respective contact below the press-input threshold (e.g., an "up stroke" of the respective press input).

In some embodiments of the disclosure, the device optionally employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input optionally includes an increase in intensity of the respective contact above the press-input intensity threshold and a subsequent decrease in intensity of the contact below the hysteresis intensity threshold that corresponds to the press-input intensity threshold, and the respective operation is optionally performed in response to detecting the subsequent decrease in intensity of the respective contact below the hysteresis intensity threshold (e.g., an "up stroke" of the respective press input). Similarly, in some embodiments, the press input is optionally detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is optionally performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in some embodiments of the disclosure where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Therefore, according to the above, some examples of the disclosure are directed to a method for launching an application in a media stream, comprising: receiving the media stream; detecting a trigger in the media stream indicative of a reduced-content application bundle; extracting the reduced-content application bundle from the media stream; retrieving information associated with the reduced-content application bundle; and launching the reduced-content application bundle using the retrieved information. Additionally or alternatively to one or more of the examples disclosed above, in some examples the method further comprises extracting the reduced-content application bundle when the bundle is embedded in the media stream. Additionally or alternatively to one or more of the examples disclosed above, in some examples retrieving information associated with the reduced-content application bundle comprises: extracting a uniform resource locator (URL) from the reduced-content application bundle; and downloading a program associated with the URL. Additionally or alternatively to one or more of the examples disclosed above, in some examples retrieving information associated with the reduced-content application bundle further comprises: identifying a server based on the URL; and downloading the program from the server. Additionally or alternatively to one or more of the examples disclosed above, in some examples retrieving information associated with the reduced-content application bundle further comprises: creating a context with the URL; and downloading a JavaScript program linked to the URL. Additionally or alternatively to one or more of the examples disclosed above, in some examples retrieving information associated with the reduced-content application bundle further comprises downloading display-related information from the server. Additionally or alternatively to one or more of the examples disclosed above, in some examples retrieving information associated with the reduced-content application bundle further comprises executing run-time code to download information from the server. Additionally or alternatively to one or more of the examples disclosed above, in some examples the method further comprises launching the reduced-content application bundle as a process separate from a video displaying process. Additionally or alternatively to one or more of the examples disclosed above, in some examples the method further comprises launching the reduced-content application bundle within a video displaying process. Additionally or alternatively to one or more of the examples disclosed above, in some examples the information includes launch criteria, and the reduced-content application bundle is launched in accordance with the launch criteria. Additionally or alternatively to one or more of the examples disclosed above, in some examples the reduced-content application bundle is extracted from a playlist in the media stream.

Some examples of the disclosure are directed to a device for launching an application in a media stream, comprising: a network interface for receiving the media stream; and a processor communicatively coupled to the network interface and capable of detecting a trigger in the media stream indicative of a reduced-content application bundle, extracting the reduced-content application bundle from the media stream, retrieving information associated with the reduced-content application bundle, and launching the reduced-content application bundle using the retrieved information. Additionally or alternatively to one or more of the examples disclosed above, in some examples the processor is further capable of extracting the reduced-content application bundle when the bundle is embedded in the media stream. Additionally or alternatively to one or more of the examples disclosed above, in some examples the processor is further capable of retrieving information associated with the reduced-content application bundle by extracting a uniform resource locator (URL) from the reduced-content application bundle, and downloading a program associated with the URL. Additionally or alternatively to one or more of the examples disclosed above, in some examples the processor is further capable of retrieving information associated with the reduced-content application bundle by identifying a server based on the URL; and downloading the program from the server. Additionally or alternatively to one or more of the examples disclosed above, in some examples the processor is further capable of retrieving information associated with the reduced-content application bundle by creating a context with the URL, and downloading a JavaScript program linked to the URL. Additionally or alternatively to one or more of the examples disclosed above, in some examples the processor is further capable of retrieving information associated with the reduced-content application bundle by downloading display-related information from the server. Additionally or alternatively to one or more of the examples disclosed above, in some examples the processor is further capable of retrieving information associated with the reduced-content application bundle by executing run-time code to download information from the server. Additionally or alternatively to one or more of the examples disclosed above, in some examples the processor is further capable of launching the reduced-content application bundle as a process separate from a video displaying process. Additionally or alternatively to one or more of the examples disclosed above, in some examples the processor is further capable of launching the reduced-content application bundle within a video displaying process. Additionally or alternatively to one or more of the examples disclosed above, in some examples the information includes launch criteria, and the processor is further capable of launching the reduced-content application bundle in accordance with the launch criteria. Additionally or alternatively to one or more of the examples disclosed above, in some examples the processor is further capable of extracting the reduced-content application bundle from a playlist in the media stream.

Some examples of the disclosure are directed to a method of providing for the retrieval of content from a media stream, comprising: adding a reduced-content application bundle to the media stream, wherein the reduced-content application bundle includes a uniform resource locator (URL) from which a program can be retrieved. Additionally or alternatively to one or more of the examples disclosed above, in some examples the method further comprises embedding the reduced-content application bundle into the media stream. Additionally or alternatively to one or more of the examples disclosed above, in some examples the method further comprises code signing the reduced-content application bundle.

Although some embodiments have been fully described herein with reference to the accompanying drawings, it is to be noted that various changes and modifications will become apparent to those skilled in the art. Such changes and modifications are to be understood as being included within the scope of the embodiments described herein as defined by the appended claims.

What is claimed is:

1. A method for accessing applications in media streams, the method comprising, by a computing device:
receiving a media stream, wherein the media stream includes timed metadata defining a launch criteria, the timed metadata being encoded and embedded into the media stream and including a reduced-content application bundle;
in response to detecting a first trigger during playback of the media stream:
extracting the reduced-content application bundle from the media stream, wherein the reduced-content application bundle is associated with an application that is not yet installed on the computing device,
installing the application via a uniform resource locator (URL) included in the reduced-content application bundle,
loading the application into memory that is accessible to the computing device, and
causing the application to launch in a background state in response to determining that the launch criteria has been satisfied; and
in response to detecting a second trigger during playback of the media stream:
causing the application to be displayed in a foreground state on a display device with which the computing device is communicatively coupled.

2. The method of claim 1, wherein installing the application comprises:
identifying a server based on the URL; and
downloading, from the server, logic and/or content associated with the application.

3. The method of claim 2, wherein the logic is defined using run-time executable code.

4. The method of claim 1, wherein the application is managed as a process that is separate from a video displaying process associated with the media stream.

5. The method of claim 4, wherein the application is displayed within the video displaying process.

6. The method of claim 1, wherein the media stream or the reduced-content application bundle is associated with launch criteria that includes at least the second trigger.

7. The method of claim 1, wherein the reduced-content application bundle is extracted from a playlist in the media stream.

8. A non-transitory computer readable storage medium configured to store instructions that, when executed by at least one processor included in a computing device, cause the computing device to access applications in media streams, by carrying out steps that include:
receiving a media stream, wherein the media stream includes timed metadata defining a launch criteria, the timed metadata being encoded and embedded into the media stream and including a reduced-content application bundle;
in response to detecting a first trigger during playback of the media stream:
extracting the reduced-content application bundle from the media stream, wherein the reduced-content application bundle is associated with an application that is not yet installed on the computing device,
installing the application via a uniform resource locator (URL) included in the reduced-content application bundle,
loading the application into memory that is accessible to the computing device, and
causing the application to launch in a background state in response to determining that the launch criteria has been satisfied; and
in response to detecting a second trigger during playback of the media stream:
causing the application to be displayed in a foreground state on a display device with which the computing device is communicatively coupled.

9. The non-transitory computer readable storage medium of claim 8, wherein installing the application comprises:
identifying a server based on the URL; and
downloading, from the server, logic and/or content associated with the application.

10. The non-transitory computer readable storage medium of claim 9, wherein the logic is defined using run-time executable code.

11. The non-transitory computer readable storage medium of claim 8, wherein the application is managed as a process that is separate from a video displaying process associated with the media stream.

12. The non-transitory computer readable storage medium of claim 11, wherein the application is displayed within the video displaying process.

13. The non-transitory computer readable storage medium of claim 8, wherein the media stream or the reduced-content application bundle is associated with launch criteria that includes at least the second trigger.

14. The non-transitory computer readable storage medium of claim 8, wherein the reduced-content application bundle is extracted from a playlist in the media stream.

15. A computing device configured to access applications in media streams, the computing device comprising at least one processor configured to cause the computing device to carry out steps that include:
receiving a media stream, wherein the media stream includes timed metadata defining a launch criteria, the timed metadata being encoded and embedded into the media stream and including a reduced-content application bundle;
in response to detecting a first trigger during playback of the media stream:
extracting the reduced-content application bundle from the media stream, wherein the reduced-content application bundle is associated with an application that is not yet installed on the computing device,
installing the application via a uniform resource locator (URL) included in the reduced-content application bundle,
loading the application into memory that is accessible to the computing device, and
causing the application to launch in a background state in response to determining that the launch criteria has been satisfied; and
in response to detecting a second trigger during playback of the media stream:
causing the application to be displayed in a foreground state on a display device with which the computing device is communicatively coupled.

16. The computing device of claim 15, wherein installing the application comprises:
identifying a server based on the URL; and
downloading, from the server, logic and/or content associated with the application.

17. The computing device of claim 16, wherein the logic is defined using run-time executable code.

18. The computing device of claim 15, wherein the application is managed as a process that is separate from a video displaying process associated with the media stream.

19. The computing device of claim 18, wherein the application is displayed within the video displaying process.

20. The computing device of claim 15, wherein the media stream or the reduced-content application bundle is associated with launch criteria that includes at least the second trigger.

* * * * *